(12) United States Patent
Willcox et al.

(10) Patent No.: US 7,954,383 B2
(45) Date of Patent: Jun. 7, 2011

(54) METHOD AND APPARATUS FOR PRESSURE MEASUREMENT USING FILL TUBE

(75) Inventors: Charles R. Willcox, Eden Prairie, MN (US); Robert C. Hedtke, Young America, MN (US); Liangju Lu, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 127 days.

(21) Appl. No.: 12/327,050

(22) Filed: Dec. 3, 2008

(65) Prior Publication Data
US 2010/0132472 A1 Jun. 3, 2010

(51) Int. Cl.
*G01L 9/12* (2006.01)
(52) U.S. Cl. .................. 73/718; 73/716; 73/717; 73/723
(58) Field of Classification Search .................. None
See application file for complete search history.

(56) References Cited

U.S. PATENT DOCUMENTS

| | | | |
|---|---|---|---|
| 2,533,339 A | 12/1950 | Willenborg | 177/311 |
| 3,169,402 A | 8/1961 | Baker | 73/407 |
| 3,012,432 A | 12/1961 | Moore et al. | 73/40 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,410,135 A | 11/1968 | Reynaud | 73/141 |
| 3,557,621 A | 1/1971 | Ferran | 73/398 |
| 3,561,832 A | 2/1971 | Karrer et al. | 310/9.6 |
| 3,697,835 A | 10/1972 | Satori | 317/246 |
| 3,808,480 A | 4/1974 | Johnston | 317/256 |
| 3,924,219 A | 12/1975 | Braun | 338/34 |
| 4,008,619 A | 2/1977 | Alcaide et al. | 73/398 |
| 4,120,206 A | 10/1978 | Rud | 73/718 |
| 4,158,217 A | 6/1979 | Bell | 361/283 |
| 4,161,123 A | 7/1979 | Carpenter | 73/741 |
| 4,168,518 A | 9/1979 | Lee | 361/283 |
| 4,177,496 A | 12/1979 | Bell et al. | 361/283 |

(Continued)

FOREIGN PATENT DOCUMENTS

DE    1 932 899    1/1971

(Continued)

OTHER PUBLICATIONS

"Notification of Transmittal of the International Search Report and the Written Opinion of the International Searching Authority, or the Declaration"; PCT/US2006/046742; filed Jul. 12, 2006; 11 pages.
"Notification of Transmittal of the International Search Report and the Written Opinion" for PCT/US2007/012050.
"Notification of Transmittal of the International Search Report and the Written Opinion of the International Searching Authority, or the Declaration", PCT/US2006/036404, filed Sep. 19, 2006; 2 pages.

(Continued)

*Primary Examiner* — Lisa M Caputo
*Assistant Examiner* — Jermaine Jenkins
(74) *Attorney, Agent, or Firm* — Westman, Champlin & Kelly, P.A.

(57) ABSTRACT

A pressure sensor includes a fill tube which is arranged to couple to a process pressure. A sensor is coupled to the fill tube and is configured to measure pressure of fluid in the fill tube as a function of a change of a physical property of the fill tube. Circuitry is provided to measure pressure using the pressure sensor, and to measure pressure based upon the change of the physical property of the fill tube.

31 Claims, 19 Drawing Sheets

U.S. PATENT DOCUMENTS

| | | | |
|---|---|---|---|
| 4,227,419 A | 10/1980 | Park | 73/724 |
| 4,244,226 A | 1/1981 | Green et al. | 73/703 |
| 4,287,553 A | 9/1981 | Braunlich | 361/283 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,466,290 A | 8/1984 | Frick | 73/756 |
| 4,490,773 A | 12/1984 | Moffatt | 361/283 |
| 4,531,415 A | 7/1985 | Orlowski et al. | 73/718 |
| 4,538,466 A | 9/1985 | Kerber | 73/724 |
| 4,542,436 A | 9/1985 | Carusillo | 361/283 |
| 4,558,184 A | 12/1985 | Busch-Vishniac et al. | 381/174 |
| 4,562,742 A | 1/1986 | Bell | 73/718 |
| 4,578,735 A | 3/1986 | Knecht et al. | 361/283 |
| 4,586,108 A | 4/1986 | Frick | 73/718 |
| 4,604,901 A | 8/1986 | Kagi | 73/731 |
| 4,623,813 A | 11/1986 | Naito et al. | 310/313 R |
| 4,644,796 A | 2/1987 | Ward | 73/702 |
| 4,670,733 A | 6/1987 | Bell | 338/36 |
| 4,739,666 A | 4/1988 | Hafner et al. | 73/862.68 |
| 4,741,213 A | 5/1988 | Hojoh | 73/702 |
| 4,785,669 A | 11/1988 | Benson et al. | 73/718 |
| 4,829,826 A | 5/1989 | Valentin et al. | 73/718 |
| 4,860,232 A | 8/1989 | Lee et al. | 364/571.04 |
| 4,864,874 A | 9/1989 | Hafner | 73/862.382 |
| 4,875,369 A | 10/1989 | Delatorre | 73/151 |
| 4,878,012 A | 10/1989 | Schulte et al. | 324/60 |
| 4,878,385 A | 11/1989 | Lloyd | 73/704 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,995,265 A | 2/1991 | Stocker | 73/702 |
| 5,012,677 A | 5/1991 | Shimada et al. | 73/721 |
| 5,094,109 A | 3/1992 | Dean et al. | 73/718 |
| 5,136,885 A | 8/1992 | Liebermann et al. | 73/702 |
| 5,144,841 A | 9/1992 | Brouwers et al. | 73/706 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,291,795 A | 3/1994 | Hafner | 73/862.629 |
| 5,329,818 A | 7/1994 | Frick et al. | 73/708 |
| 5,415,048 A | 5/1995 | Diatschenko et al. | 73/861.04 |
| 5,469,749 A | 11/1995 | Shimada et al. | 73/861.47 |
| 5,471,882 A | 12/1995 | Wiggins | 73/702 |
| 5,492,016 A | 2/1996 | Pinto et al. | 73/724 |
| 5,524,492 A | 6/1996 | Frick et al. | 73/706 |
| 5,531,120 A | 7/1996 | Nagasu et al. | 73/706 |
| 5,542,300 A | 8/1996 | Lee | 73/724 |
| 5,637,802 A | 6/1997 | Frick et al. | 73/724 |
| 5,642,301 A | 6/1997 | Warrior et al. | 364/571.02 |
| 5,705,978 A | 1/1998 | Frick et al. | 340/611 |
| 5,757,608 A | 5/1998 | Bernot et al. | 361/283.4 |
| 5,760,310 A | 6/1998 | Rud et al. | 73/706 |
| 5,911,162 A | 6/1999 | Denner | 73/718 |
| 5,920,016 A | 7/1999 | Broden | 73/756 |
| 5,969,258 A | 10/1999 | Gerst et al. | 73/718 |
| 5,992,240 A | 11/1999 | Tsuruoka et al. | 73/718 |
| 6,003,219 A | 12/1999 | Frick et al. | 29/25.41 |
| 6,236,096 B1 | 5/2001 | Chang et al. | 257/419 |
| 6,250,164 B1* | 6/2001 | O'Brien et al. | 73/730 |
| 6,295,875 B1 | 10/2001 | Frick et al. | 73/718 |
| 6,301,973 B1 | 10/2001 | Smith | 73/861.357 |
| 6,367,333 B1* | 4/2002 | Bullister et al. | 73/715 |
| 6,484,585 B1 | 11/2002 | Sittler et al. | 73/718 |
| 6,508,131 B2 | 1/2003 | Frick | 73/756 |
| 6,520,020 B1 | 2/2003 | Lutz et al. | 73/706 |
| 6,539,807 B1* | 4/2003 | Wohlrab et al. | 73/723 |
| 6,543,291 B1* | 4/2003 | Kurtz et al. | 73/716 |
| 6,564,643 B1 | 5/2003 | Horie et al. | 73/724 |
| 6,647,794 B1 | 11/2003 | Nelson et al. | 73/718 |
| 6,654,697 B1 | 11/2003 | Eryurek et al. | 702/47 |
| 6,662,662 B1 | 12/2003 | Nord et al. | 73/715 |
| 6,675,655 B2 | 1/2004 | Broden | 73/716 |
| 6,701,274 B1 | 3/2004 | Eryurek et al. | 702/140 |
| 6,828,801 B1 | 12/2004 | Burdick et al. | 324/658 |
| 6,892,582 B1 | 5/2005 | Satou et al. | 73/715 |
| 6,901,101 B2 | 5/2005 | Frick | 372/92 |
| 6,945,115 B1 | 9/2005 | Wang | 3/718 |
| 6,992,492 B2 | 1/2006 | Burdick et al. | 324/658 |
| 7,379,629 B1 | 5/2008 | Burns | 385/12 |
| 7,467,555 B2* | 12/2008 | Schulte et al. | 73/736 |
| 7,540,196 B2* | 6/2009 | Kurtz et al. | 73/714 |
| 7,624,642 B2* | 12/2009 | Romo | 73/717 |
| 2002/0117006 A1 | 8/2002 | Paros et al. | 73/717 |
| 2002/0178827 A1 | 12/2002 | Wang | 73/718 |
| 2004/0015069 A1 | 1/2004 | Brown | 600/407 |
| 2004/0093951 A1 | 5/2004 | Viola et al. | 73/728 |
| 2004/0168523 A1 | 9/2004 | Fernald et al. | 73/861.01 |
| 2004/0233458 A1 | 11/2004 | Frick | 356/480 |
| 2005/0005712 A1 | 1/2005 | Gysling et al. | 73/861.23 |
| 2005/0011278 A1 | 1/2005 | Brown et al. | 73/861.18 |
| 2005/0041375 A1 | 2/2005 | Rosenau | 361/524 |
| 2005/0063444 A1 | 3/2005 | Frick | 372/92 |
| 2005/0097963 A1 | 5/2005 | Wilda | 73/716 |
| 2005/0132808 A1 | 6/2005 | Brown et al. | 73/592 |
| 2006/0070448 A1 | 4/2006 | Baumann et al. | 73/730 |
| 2006/0206288 A1 | 9/2006 | Brahmajosyula et al. | 702/183 |
| 2006/0232281 A1 | 10/2006 | Vittorio et al. | 324/652 |
| 2006/0278005 A1 | 12/2006 | Broden et al. | 73/716 |
| 2006/0278007 A1 | 12/2006 | Harasyn et al. | 73/723 |
| 2007/0220985 A1 | 9/2007 | Hedtke | 73/715 |

FOREIGN PATENT DOCUMENTS

| | | |
|---|---|---|
| DE | 3340834 A1 | 5/1985 |
| DE | 43 33 753 | 5/1994 |
| EP | 0 423 903 A2 | 6/1985 |
| EP | 0291393 | 11/1988 |
| EP | 0 524 550 A1 | 1/1993 |
| EP | 1 026 493 A2 | 8/2000 |
| FR | 941804 | 1/1949 |
| GB | 1530952 | 3/1976 |
| GB | 2178536 | 2/1987 |
| JP | 2005280536 | 10/2005 |
| WO | WO 93/04343 | 3/1993 |
| WO | WO 93/04349 | 3/1993 |
| WO | WO 99/53286 | 10/1999 |
| WO | WO 01/59418 | 8/2001 |
| WO | WO 01/59419 | 8/2001 |
| WO | WO 02/23148 | 3/2002 |
| WO | WO 2005/033643 | 4/2005 |
| WO | WO 2006/092052 | 9/2006 |
| WO | WO 2007/019676 | 2/2007 |

OTHER PUBLICATIONS

"International Search Report", PCT/US2006, 036404, filed Sep. 19, 2006; 3 pages.

"Written Opinion of the International Searching Authority", PCT/US2006/036404, filed Sep. 19, 2006; 6 pages.

Notification of Transmittal of the International Search Report and the Written Opinion of the International Searching Authority, or the Declaration of PCT/US2006/020254.

Notification of Transmittal of the International Search Report and the Written Opinion of the International Searching Authority, or the Declaration for PCT/US2006/019955.

Notification of Transmittal of the International Search Report and the Written Opinion of the International Searching Authority, or the Declaration for International Application No. PCT/US2009/064712 filed Nov. 17, 2009; 14 pages.

Notification of Transmittal of the International Search Report and the Written Opinion of the International Searching Authority, or the Declaration for International Application No. PCT/US2009/064705 filed Nov. 17, 2009; 16 pages.

Notification of Transmittal of the International Search Report and the Written Opinion of the International Searching Authority, or the Declaration for International Application No. PCT/US2009/064716 filed Nov. 17, 2009; 13 pages.

* cited by examiner

INDUCTANCE CHANGE WITH STRESS VERSUS APPLIED BIAS FIELD ns in an industrial processes. More specifically, the present invention relates to measuring a pressure with a fill tube.
METHOD AND APPARATUS FOR PRESSURE MEASUREMENT USING FILL TUBE

CROSS REFERENCE TO RELATED APPLICATIONS

This application is related to co-pending application Ser. No. 12/327,053, filed Dec. 3, 2008, entitled METHOD AND APPARATUS FOR PRESSURE MEASUREMENT USING QUARTZ CRYSTAL; and Ser. No. 12/327,057, filed Dec. 3, 2008, entitled METHOD AND APPARATUS FOR PRESSURE MEASUREMENT USING MAGNETIC PROPERTY; which are hereby incorporated by reference in their entirety.

BACKGROUND OF THE INVENTION

The present invention relates to measurement of pressures in an industrial processes. More specifically, the present invention relates to measuring a pressure with a fill tube.

Industrial processes are used in the manufacturing and transport of many types of materials. In such systems, it is often required to measure different types of pressure within the process. One type of pressure, which is frequently measured, is a differential pressure, which is the pressure difference between one point in the process and another point in the process. For example, the differential pressure across an orifice plate in a tube containing a flow of process fluid is related to the flow rate of the fluid. Differential pressures can also be used, for example, to measure height of a process fluid in a tank or other container.

In such industrial processes, the pressure sensors are typically contained in, or coupled to, a pressure transmitter which is located at a remote location and transmits the pressure information back to a centralized location such as a control room. The transmission is frequently over a process control loop. For example, a two-wire process control loop is often used in which two wires are used to carry both information as well as power to the transmitter. Wireless communication techniques may also be used.

In many process installations, it is also desirable to measure an absolute or gauge pressure, herein referred to a "line pressure", of the process. This information can be used, for example, to provide more accurate flow measurements by including changes in density of the process fluid in the flow calculations. Typically, the additional pressure measurement requires an additional pressure sensor coupled to the process fluid. For example, an additional pressure transmitter can be deployed which includes a line pressure sensor and coupled to the two-wire process control loop.

SUMMARY

A pressure sensor includes a fill tube which is arranged to couple to a process pressure. A sensor is coupled to the fill tube and is configured to measure pressure of fluid in the fill tube as a function of a change of a physical property of the fill tube.

DETAILED DESCRIPTION

In one embodiment, the present invention provides an apparatus and method for determining line pressure in a differential pressure measurement configuration. More specifically, in one aspect, the present invention monitors deformations in a capillary tube used to couple a differential pressure sensor to process fluid. These deformations are related to line pressure of the process fluid. In other embodiments, the present invention provides techniques for measuring a pressure based upon deformation of a vessel. In another embodiment, the present invention provides a sensor for measuring line pressure.

Figure 1:
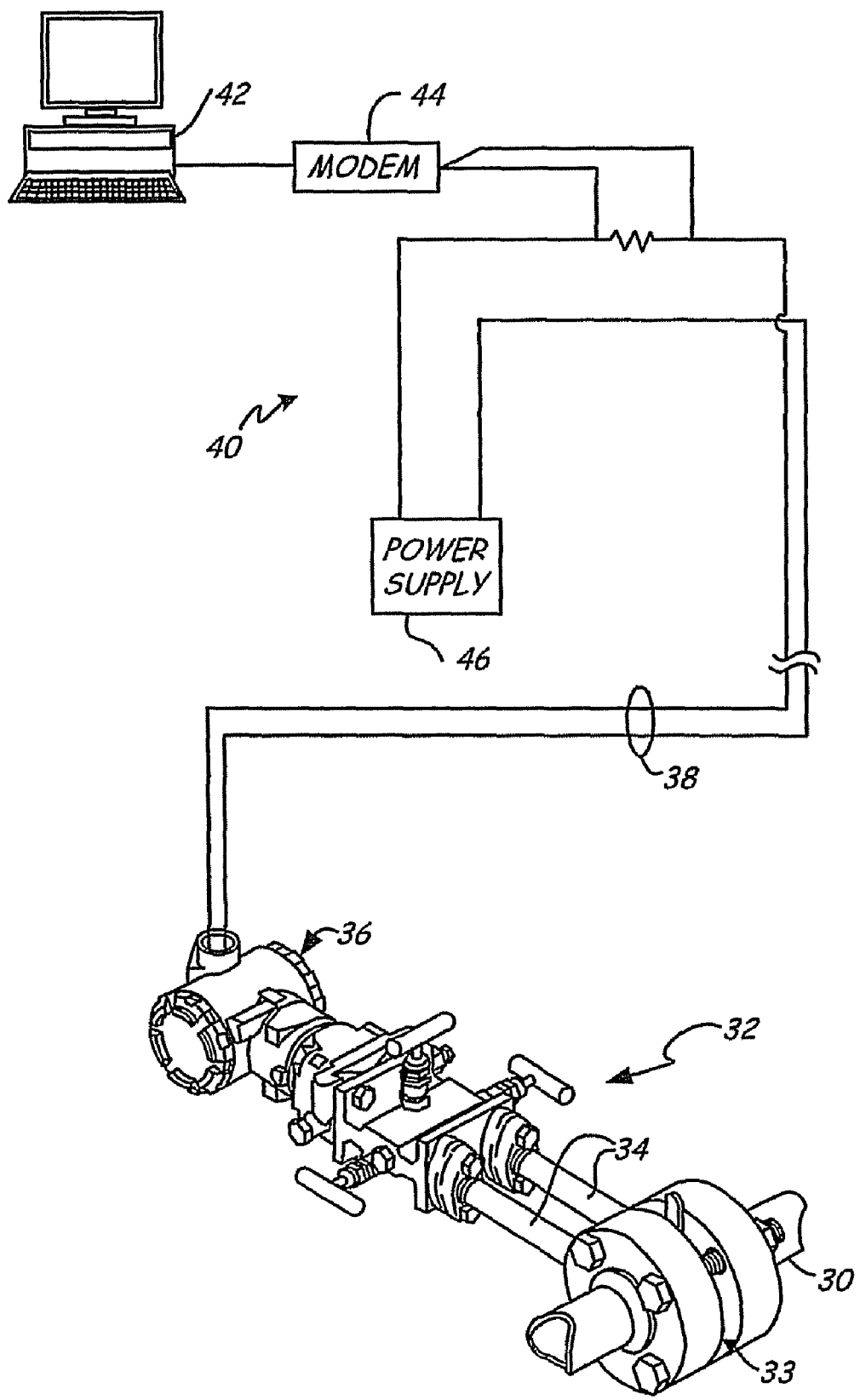
FIG. 1 shows a process measurement system with a process transmitter constructed in accordance with the present invention.

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses a differential process pressure and converts it to a standardized transmission signal that is a function of the process pressure.

A process loop 38 provides both a power signal to the transmitter 36 from control room 40 and bi-directional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A computer 42 or other information handling system through modem 44, or other network interface, is used for communication with the transmitter 36. A remote voltage power supply 46 powers the transmitter 36. In another example configuration, loop 38 is a wireless connection in which data may be transmitted or received with out the need of wires extending between the transmitter 36 and the control room 40. In other example configurations, data is transmitted and/or received wirelessly using a wireless communication protocol.

Figure 2:
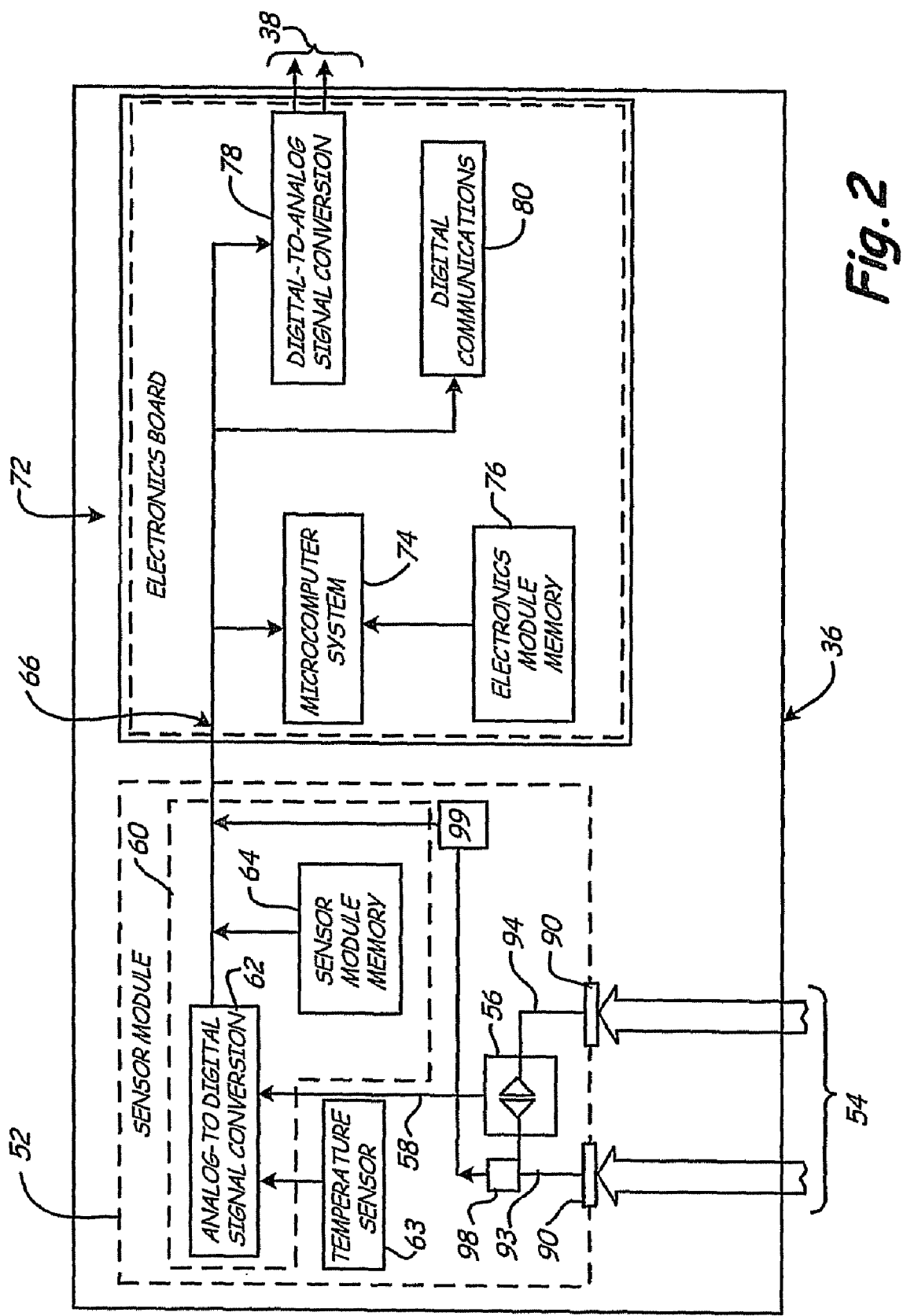
FIG. 2 is schematic view of a transmitter of FIG. 1.

FIG. 2 is a simplified block diagram of pressure transmitter 36. Pressure transmitter 36 includes a sensor module 52 and an electronics board 72 coupled together through a databus 66. Sensor module electronics 60 couples to pressure sensor 56 which received an applied differential pressure 54. The data connection 58 couples sensor 56 to an analog to digital converter 62. An optional temperature sensor 63 is also illustrated along with sensor module memory 64. The electronics board 72 includes a microcomputer system 74, electronics memory module 76, digital to analog signal conversion 78 and digital communication block 80.

Also illustrated in FIG. 2 are capillary or "fill" tubes 93 and 94 which are used to couple the differential pressure sensor 56 to the process fluid 54. Isolation diaphragms 90 receive pressures from the process fluid 54 which is responsibly applied to a fill fluid carried in capillary tubes 93 and 94. Through this fill fluid, the pressures of the industrial process are applied to the differential pressure sensor 56.

In accordance with the present invention, a deformation sensor 98 couples to a capillary tube 93 and is arranged to monitor deformation of the capillary tube 93. These deformations are related to the line pressure of the industrial process and the sensor 98 provides an output signal to analog to digital converter 62 or to line pressure measurement circuitry 99. In one aspect, any type of sensor can be used which is responsive to deformations of the tube. Circuitry 99 can be stand alone circuitry or, in some configurations, may be embodied in other circuitry used to measure the differential pressure. For example, some or all of the components used to monitor the various sensors may be shared components.

Figure 3:
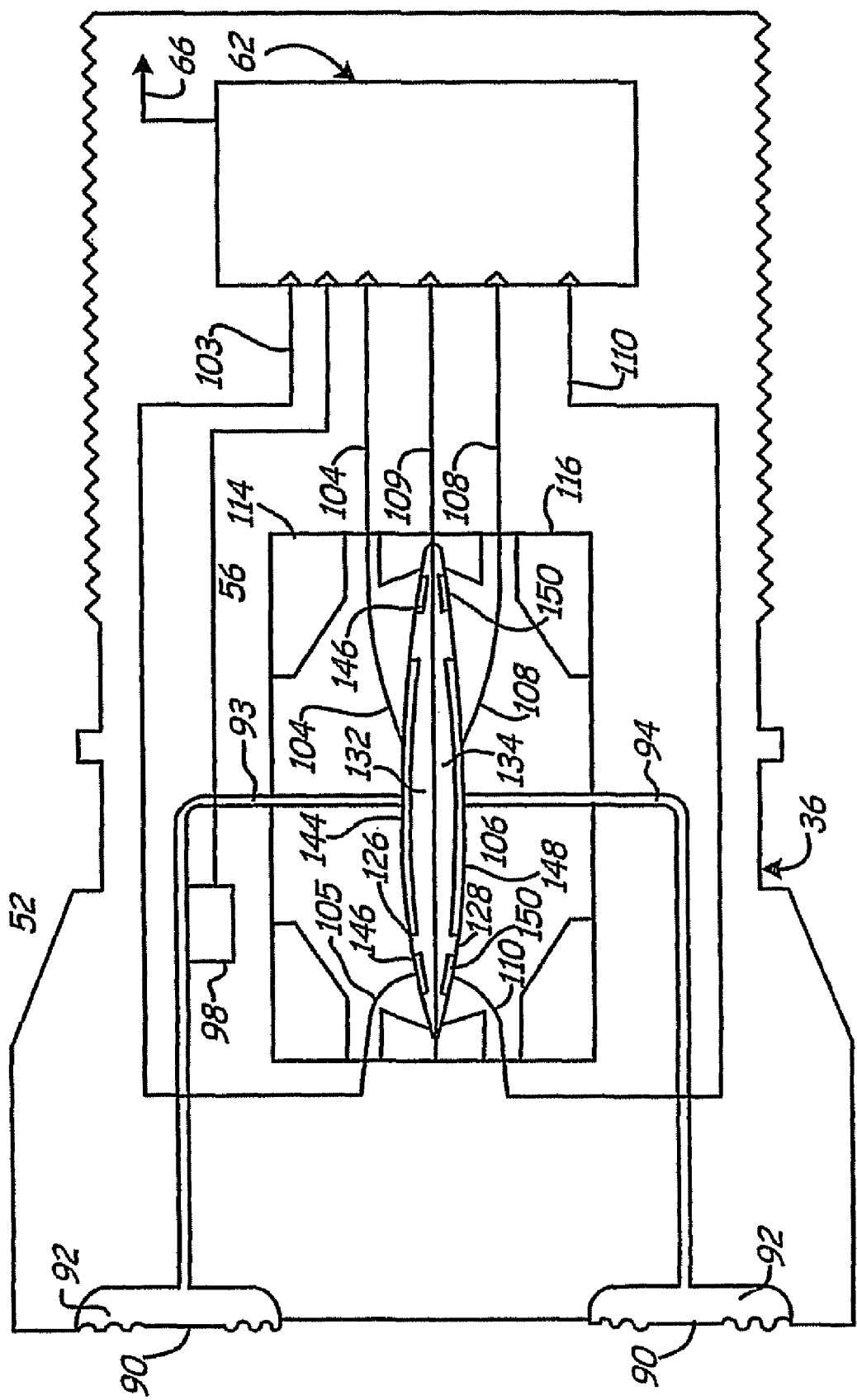
FIG. 3 shows a cross sectional view of a portion of the process transmitter of FIG. 1.

FIG. 3 is a simplified cross sectional view of one embodiment of the present invention illustrating the deformation sensor 98. As discussed above, pressure sensor 56 couples to a process fluid through isolation diaphragms 90 which isolate the process fluid from cavities 92. Cavities 92 couple to the pressure sensor module 56 through impulse piping 93 and 94. A substantially incompressible fill fluid fills cavities 92 and impulse piping 93 and 94. When a pressure from the process fluid is applied to diaphragms 90, it is transferred to parts in cavities 132 and 134 of the pressure sensor 56.

Pressure sensor 56 is formed from two pressure sensor halves 114 and 116 and filled with a preferably brittle, substantially incompressible material 105. A diaphragm 106 is suspended within a cavity 132, 134 formed within the sensor 56. An outer wall of the cavity 132, 134 carries electrodes 146, 144, 148 and 150. These can, generally, be referred to as primary electrodes 144 and 148, and secondary or secondary electrodes 146 and 150. These electrodes form capacitors with respect to the moveable diaphragm 106. The capacitors, again, can be referred to as primary and secondary capacitors.

As illustrated in FIG. 3, the various electrodes in sensor 56 are coupled to analog to digital converter 62 over electrical connection 103, 104, 108 and 110. Additionally, the deflectable diaphragm 106 couples to analog to sensor module electronics 60 through connection 109. Techniques for measuring the differential pressure are described in U.S. Pat. No. 6,295,875 entitled "PROCESS PRESSURE MEASUREMENT DEVICES WITH IMPROVED ERROR COMPENSATION" issued Oct. 2, 2001, to Rosemount Inc.

The deformation sensor 98 may take various configurations. A number of example techniques for measuring the deformation are described below. However, in one broad aspect, the present invention is not limited to these particular techniques and any technique used to measure deformation may be employed including those that are not specifically discussed herein.

The line pressure from the process fluid causes the capillary tube 93 to change shape. For example, an increased line pressure may cause the capillary tube 93 to expand. Similarly, an increased line pressure may cause any bends in the capillary tube 93 to become straighter. These, or other deformations of a capillary tube, can be monitored or otherwise measured and correlated with the line pressure of the process fluid.

Figure 4:
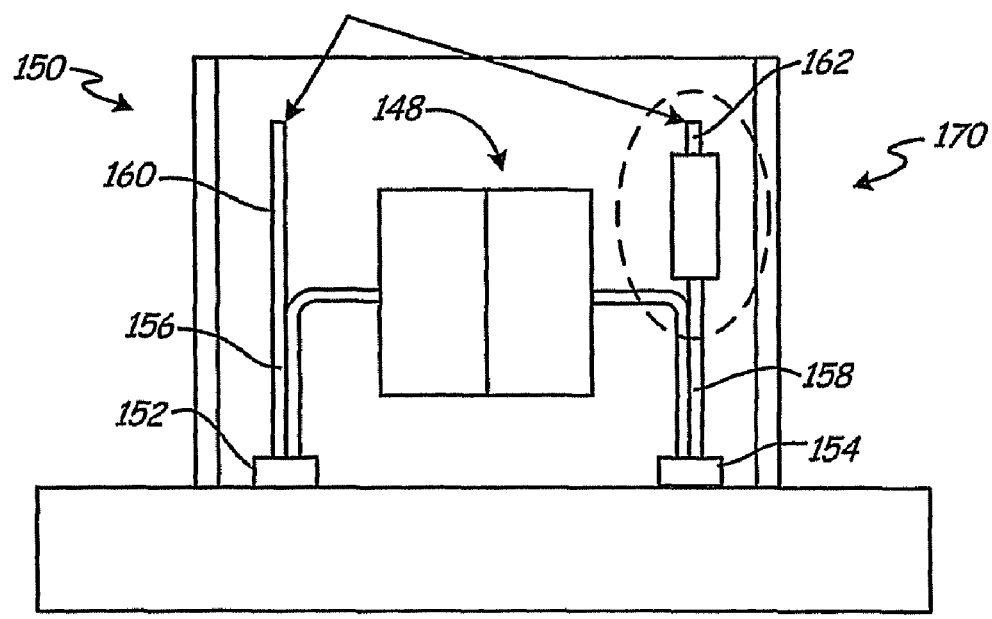
FIG. 4 is a simplified diagram showing line pressure measurement in one example configuration.

FIG. 4 is a simplified cross sectional view 150 of one example embodiment of the present invention. In the configuration of FIG. 4, a magnetostrictive property of the capillary or fill tube is used to measure deformation of the tube, which is one example of a sensor body. For example, if the fill tube is made from a nickel-iron alloy, the tube will exhibit magnetostrictive properties and will experience dimensional changes in the presence of a magnetic field. This also provides a reciprocal response such that if the metal undergoes strain, a change in magnetic induction is produced in direct proportion to the applied strain. The magnetostrictive property can be used to create a resonator (i.e., oscillator) that will cause the nickel-iron alloy to vibrate in a controlled manner. The vibration is a function of the dimension of the fill tube and its properties. Consequentially, the frequency will vary based on changes to the environment of the tube. By monitoring the frequency of the resonator, the physical state of the metal can be determined. In addition to measuring pressure, the magnetostrictive property is also related to temperature and may be used to provide a temperature measurement.

In the configuration of FIG. 4, a differential pressure sensor 148 is coupled to a process fluid to isolation diaphragms 152 and 154 through capillary tubes 156 and 158, respectively. Straight portions 160 and 162 of the capillary tubes 156, 158, respectively, are provided and may be used as fill tubes to fill the capillary tubes with fill fluid. These portions can be separate tubes or formed integral with tubes 156, 158. Although these are shown as separate tubes, they may be formed as a single tube with tubes 156, 158. Portion 162 includes a deformation sensor 170 which is configured to measure deformation of the fill tube.

Figure 5:
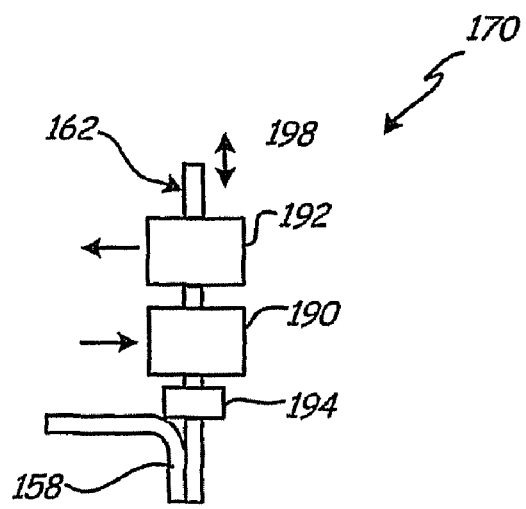
FIG. 5 is an enlargement of a portion of the configuration in FIG. 4.

FIG. 5 is a more detailed view of the deformation sensor 170 shown in FIG. 4. As illustrated in FIG. 5, a drive coil 190 is coupled to portion 162 and receives a control signal input, for example from circuitry 99 illustrated in FIG. 2. The drive coil 190 is driven at a desired frequency and induces a magnetic flux into the magnetostrictive material of 162. This causes a vibration motion 198 to occur in the portion 162. Typically, a permanent magnet (not shown) is located near the fill tube and coils to bias the tube into a favorable magnetic operating regime. A sense coil 192 is arranged adjacent to portion 162 and configured to sense the change in magnetic induction of the tube. This sense coil 192 provides an output. For example, this output can be provided to circuitry 99 illustrated in FIG. 2. A node stop 194 is also coupled to portion 162 and provides a rigid mount that is configured to reflect the longitudinal waves due to vibration 198 that occur within the tube portion 162 when oscillation begins.

Figure 6:
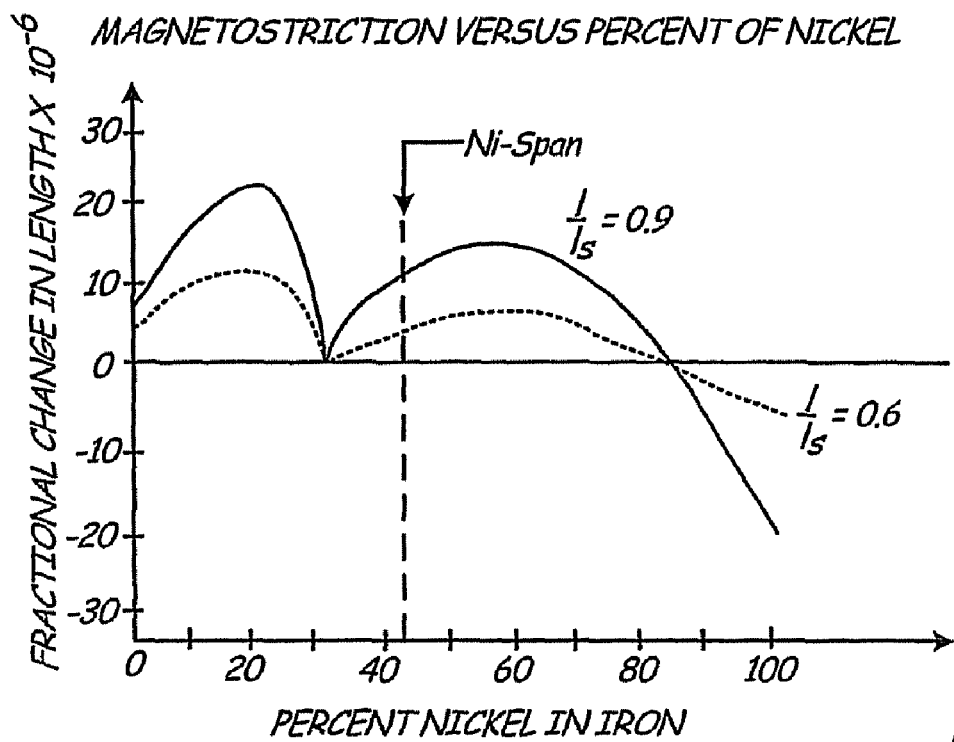
FIG. 6 is a graph showing magnetostriction versus percent of nickel.

Any appropriate magnetostrictive material may be used in accordance with the design constraints for a particular application. FIG. 6 is a graph of fractional change in length versus percent nickel in iron at different fractional field saturation levels and illustrates how the magnetostriction varies based upon the percentage of nickel in iron. Ni-Span has a percentage of Nickel of approximately 42% and produces a length increase in the presence of a magnetic field.

Figure 7:
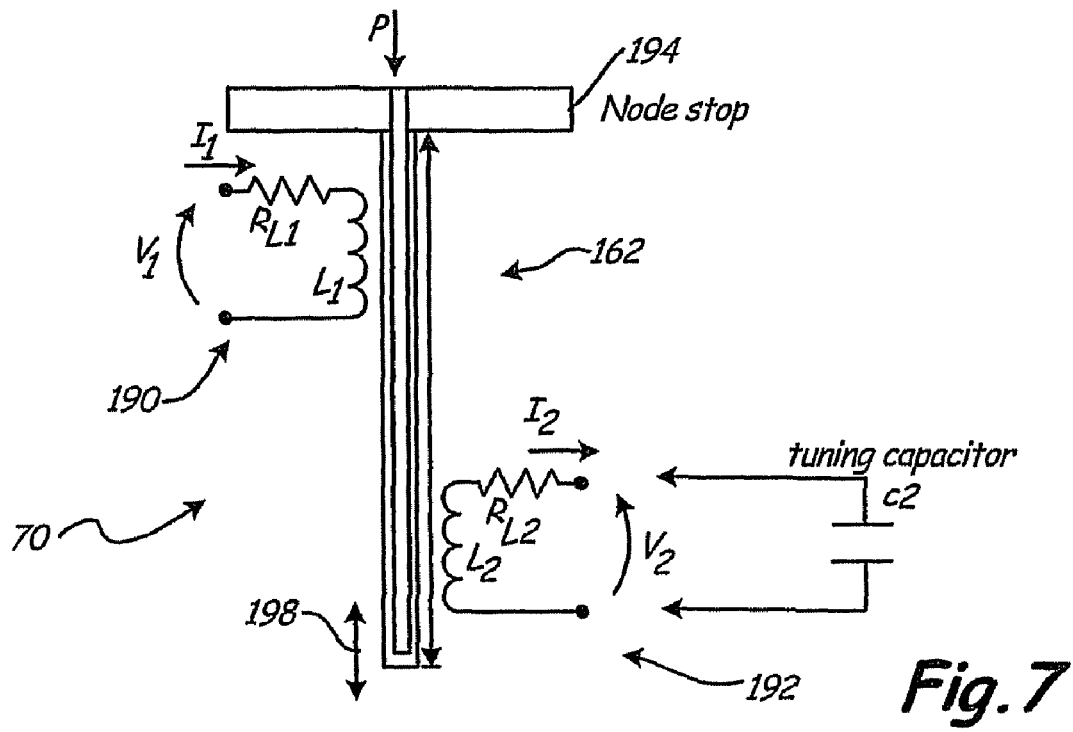
FIG. 7 is a simplified schematic diagram illustrating configurations shown in FIG. 4.

FIG. 7 is a simplified schematic diagram showing operation of deformation sensor 170 in greater detail. As illustrated in FIG. 7, the drive coil 190 is modeled as an inductance $L_1$ and a resistance $R_{L1}$. A current $I_1$ flows into the drive coil 190 and a voltage $V_1$ occurs across the drive coil 190. The sense coil 192 is similarly illustrated as an inductance $L_2$ and a resistance $R_{L2}$ with corresponding current $I_2$ and voltage $V_2$. A tuning capacitor C2 is applied across the sense coil 192. The length of the tube portion 162 is illustrated as l. During operation, the tube portion 162 will vibrate longitudinally with a fundamental frequency $f_1$ given by the expression:

$$f_1 = \frac{1}{4l}\sqrt{\frac{Eg}{\rho}} \quad \text{EQ. 1}$$

where g, E, l, and ρ are respectively, the gravitational acceleration constant, the tube's Young's Modulus, length, and density of the tube 162. By placement of the drive coil 190 which generates the magnetic field, along with the sensor coil 192 it is possible to construct a positive feedback oscillator. The drive coil and sensor coil are schematically depicted in FIG. 7. If the resonating tube is closed on one end such that pressure can be applied on the opposite end (near the node stop 194), the tube will operate as a pressure sensor where the sensor output is the frequency $f_1$ of the oscillation and varies as a function of applied pressure. As the pressure changes, the frequency of oscillation will shift due to variations in the effective values of E, l, and ρ. The drive and sense coils are illustrated as inductors $L_1$ and $L_2$ with DC resistances $R_{L1}$ and $R_{L2}$. The tuning capacitor C2 in parallel with the sense coil 192 forms an LC oscillating circuit and may be selected to have a resonant frequency which is close to that of the resonator's fundamental frequency. Preferably, the LC circuit will ensure that the proper frequency occurs at startup. Once the metal begins to resonate, this will dominate the circuit such that the resonant frequency is representative of the tube oscillation rather than the self oscillating LC circuit.

Figure 8:
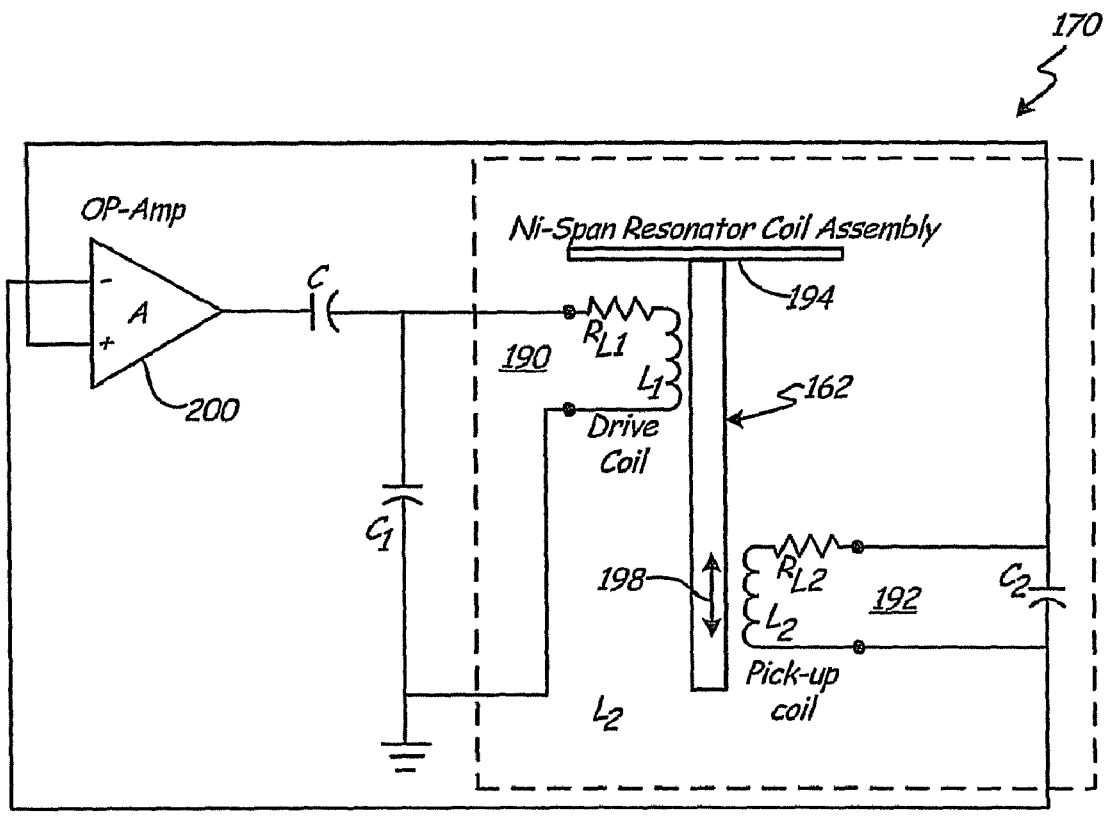
FIG. 8 is a simplified schematic diagram illustrating configurations shown in FIG. 4.
Figure 9:
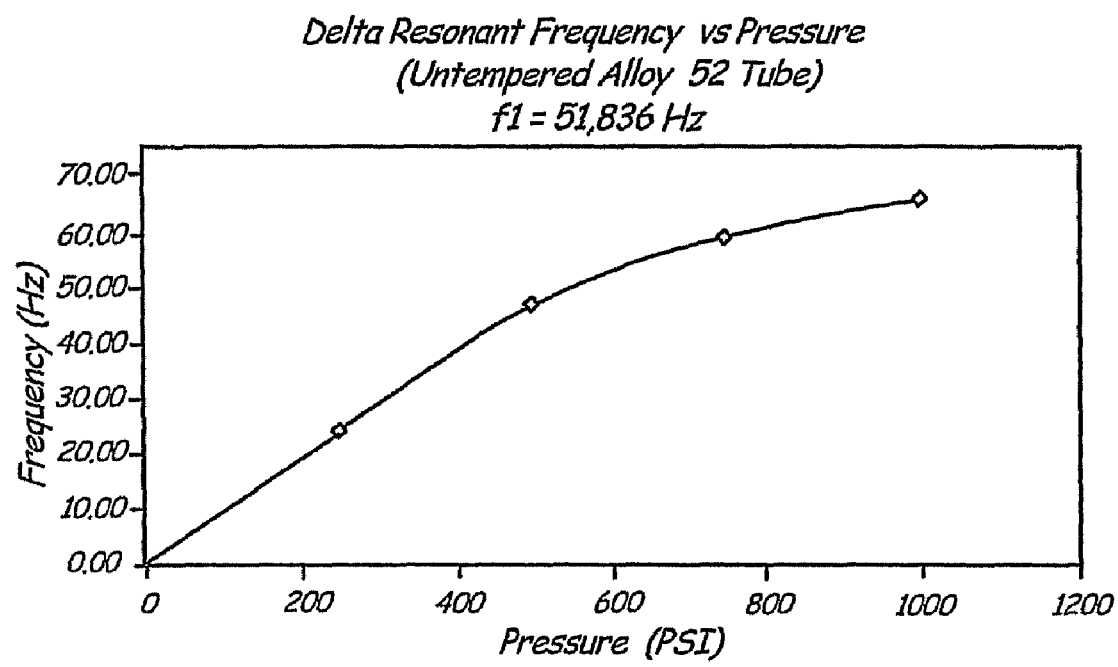
FIG. 9 is a graph of frequency versus pressure.

FIG. 8 is a simplified schematic diagram of an example resonator circuit using a large open loop gain op-amp 200. The coils 190, 192 are arranged so that a 180 degree phase shift occurs near the tube's resonant frequency thereby maintaining sustained oscillation. In one example, a test device was constructed similar to that shown in FIG. 7. A frequency generator was connected to the drive coil 190 and an oscilloscope was connected to the sense coil 192. By sweeping the drive frequency, the tube's resonant frequency can be found. The tube was then pressurized and the new resonant frequency was determined. In this way, the change in frequency with changes in applied pressure was mapped. FIG. 9 is a graph of frequency versus pressure and shows actual data taken with a pressure sensor constructed from Alloy 52. Alloy 52 is 52% Nickel and 48% Iron. The tube was welded into a pressure fitting and the opposite end welded shut. The tube was not hardened and may have been somewhat annealed by the welding procedure. In this example, the tube walls were also thicker than needed to withstand overpressure. If thinner, the sensitivity of the sensor to pressure would be increased. In spite of these shortcomings, the frequency change with pressure is easily seen. The ultimate pressure resolution of the sensor is a function of the Q-factor possible from the tube assembly. To maintain large Q-factors, the tubes should be properly hardened. The example in FIG. 9 suggests a frequency change per PSI of approximately 0.065 Hz/PSI. A sensor having a Q-factor of 1000 and a resonant frequency centered at 51,000 Hz will have potential resolution of around 0.025 Hz (0.4 PSI). A Q-factor of 2500 will have a frequency resolution potential of 0.004 Hz. This latter Q-factor would allow line pressure resolutions on the order of 0.06 PSI.

As discussed herein, the present invention is not limited to these specific techniques for measuring deformation. Another example embodiment of the present invention utilizes the stress dependent magnetic permeability, for example, of nickel-iron alloys. Nickel-iron alloys exhibit a change in their magnetic permeability when the material is placed under strain. This behavior is referred to as the Villari effect. If the alloy is magnetically biased with a fixed magnetic field (H), the resulting magnetic induction (B) is defined according to:

$$B = \mu_o \mu_R H \quad \text{EQ. 2}$$

Figure 10:
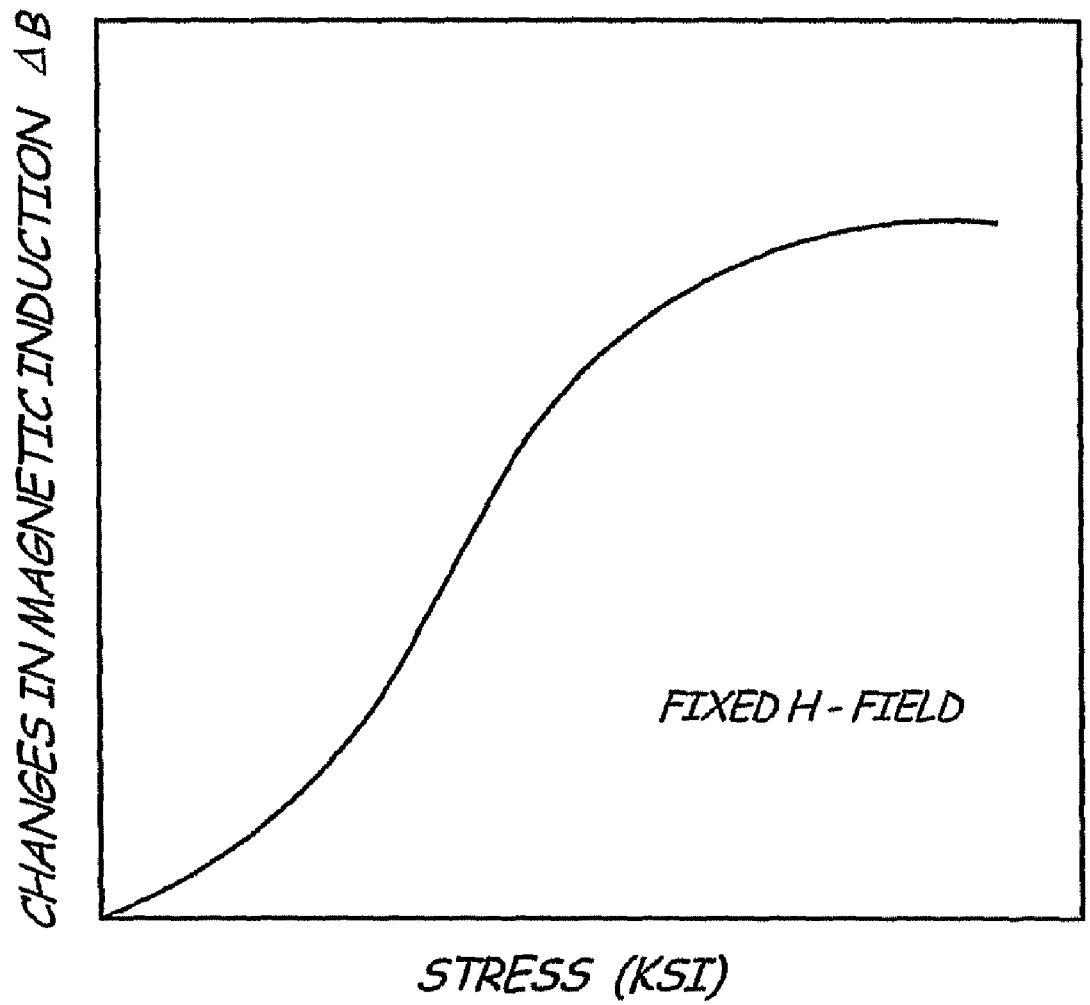
FIG. 10 is a graph of change in magnetic inductance versus stress.
Figure 11:
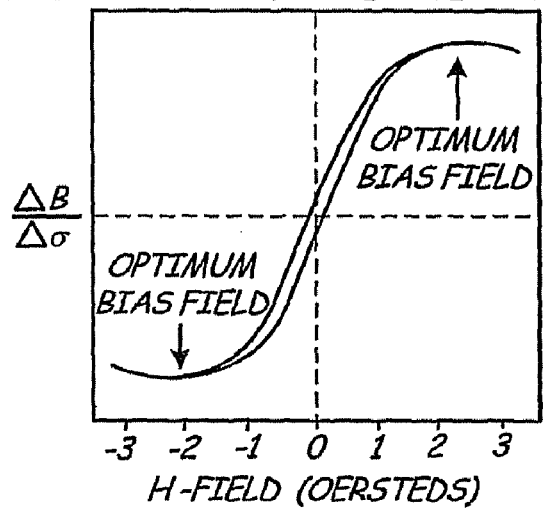
FIG. 11 is a graph of inductance change with stress versus an applied bias field.

Where, $\mu_o$ is the permeability of free space and $\mu_R$ is the relative permeability of the alloy. In accordance with Equation 2, any change with $\mu_R$ will result in a change in the magnetic inductance B. FIG. 10 is a graph of changes in magnetic induction versus applied stress for a fixed magnetic field H. Note that the sensitivity of the B field to changes in the applied stress is a function of the applied magnetic field H. Moreover, hysteretic properties of the material depend on the field strength, with the lowest hysteresis occurring at the higher field intensities. FIG. 11 is a graph showing inductance change with stress (σ is the applied stress) versus the applied bias field H. As illustrated in FIG. 11, there is a magnetic biasing point at which the hysteresis is a minimum and the sensitivity to applied stress is the greatest.

Figure 12A:
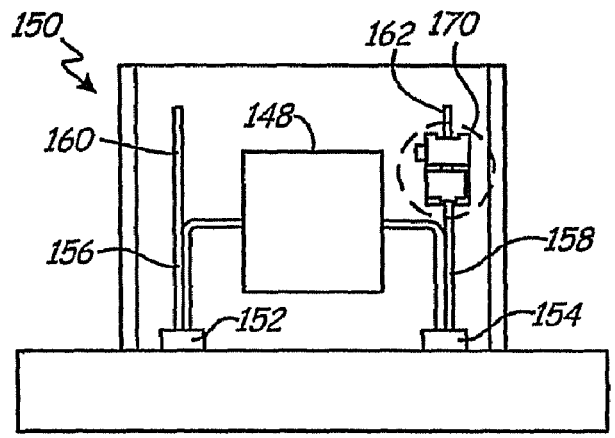
FIGS. 12A and 12B are simplified diagrams of a line pressure sensor in accordance with the present invention.
Figure 12B:
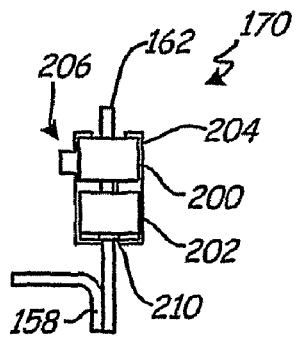

The above magnetic properties can be used to detect applied pressure. For example, the change in the B field can be measured using a coil having an inductance which is proportional to $\mu_R$. FIGS. 12A and 12B show one example configuration of sensor 170 arranged to detect pressure using this phenomenon. Elements in 12A and 12B which are similar to those shown in FIGS. 4 and 5 have retained their numbering. In this configuration, tube 162 may comprise, for example, Ni Span, Alloy 52 or nickel. A pick up coil 200 and a drive coil 202 surround tube 162 and are held in place by a clip 204. A bias magnet 206 is also mounted using clip 204. A coil stop 210 holds the coils in position with respect to tube 162. During operation, the bias magnet 206 provides a fixed bias field H about which a magnetic field is modulated using drive coil 202. The resultant B field is measured using pick up coil 200 and may be correlated with the applied pressure.

Figure 13:
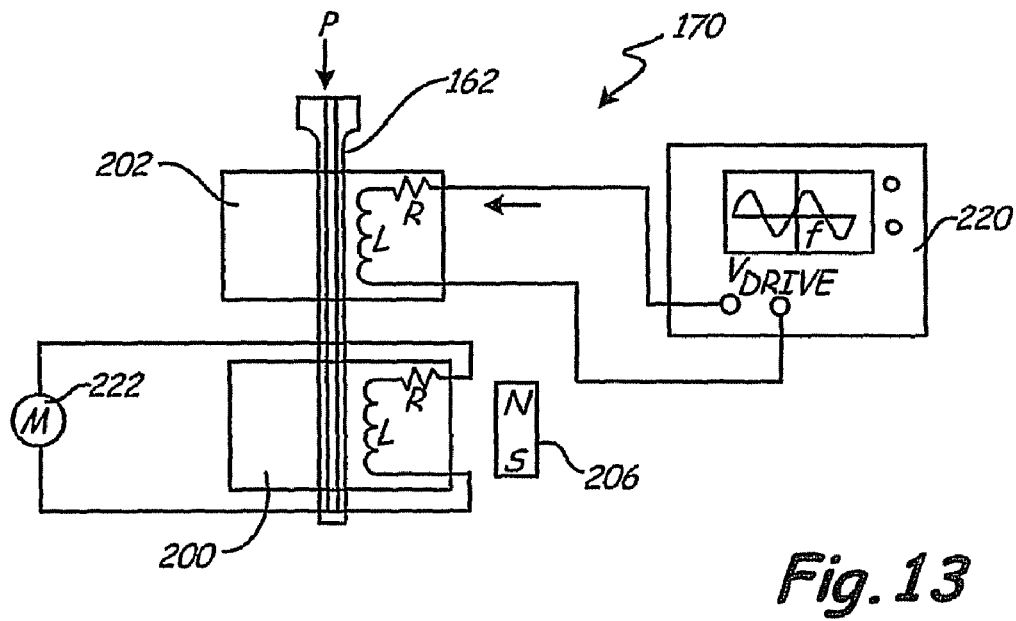
FIG. 13 is a schematic diagram in accordance with FIGS. 12A and 12B.

FIG. 13 is a schematic diagram of sensor 170 from FIG. 12B configured for electrical measurement. During operation, an AC signal generator 220 applies an alternating signal to the drive coil 202. The resultant B field is sensed using sensed coil 200. The magnitude of the signal is measured using meter 222 and is related to the permeability of the tube 162 and therefore changes with the applied pressure P. As discussed above, control of the AC signal generator 220 and sensing of the resultant signal in the sense coil can be performed by circuitry such as that shown in FIG. 3.

Figure 14A:
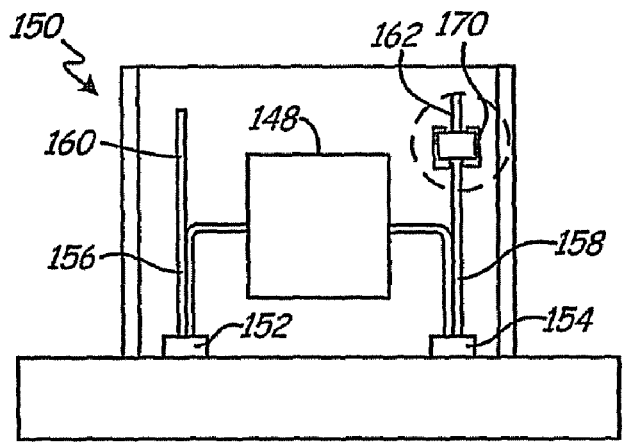
FIGS. 14A and 14B are simplified diagrams showing another example embodiment.
Figure 14B:
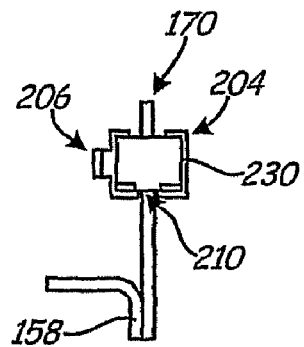
Figure 15:
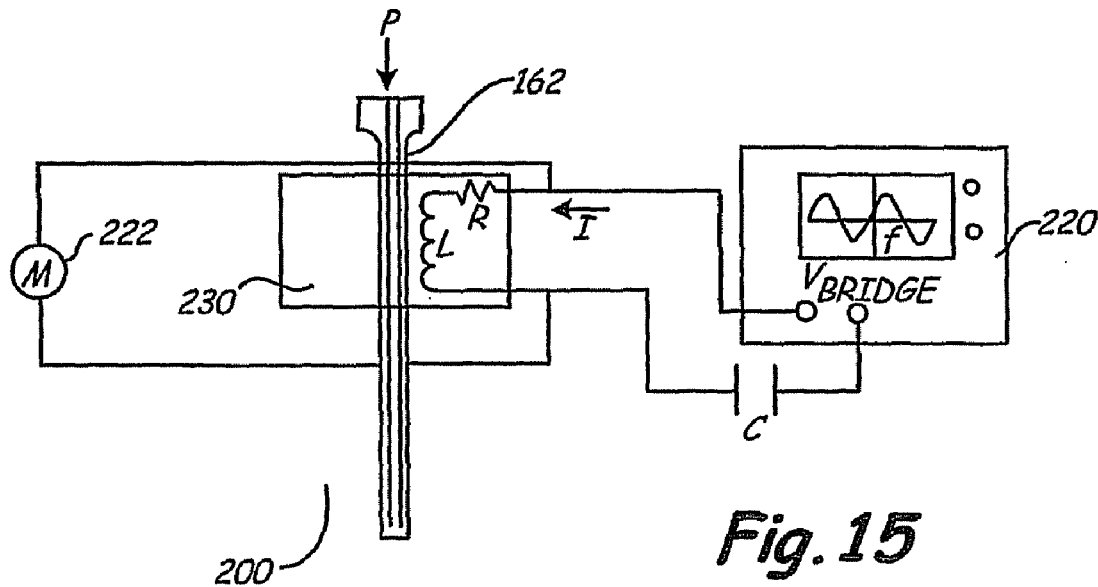
FIG. 15 is a schematic diagram in accordance with FIGS. 14A and 14B.

FIGS. 14A and 14B are simplified diagrams showing another configuration of sensor 170. In FIGS. 14A and 14B, the numbering of elements used in other figures has been maintained for consistency. In the configuration of FIGS. 14A and 14B, sensor 170 is arranged as a single coil 230. FIG. 15 is a simplified schematic diagram showing a circuit for sensing the B field using a single drive coil 230. In the configuration of FIG. 15, the AC signal generator 220 is coupled to the coil 230 through a capacitor C. The change in the B field due to the applied magnetic field may be sensed by measuring the magnitude of the voltage using voltage sensor 222 which is coupled across coil 230.

Figure 16:
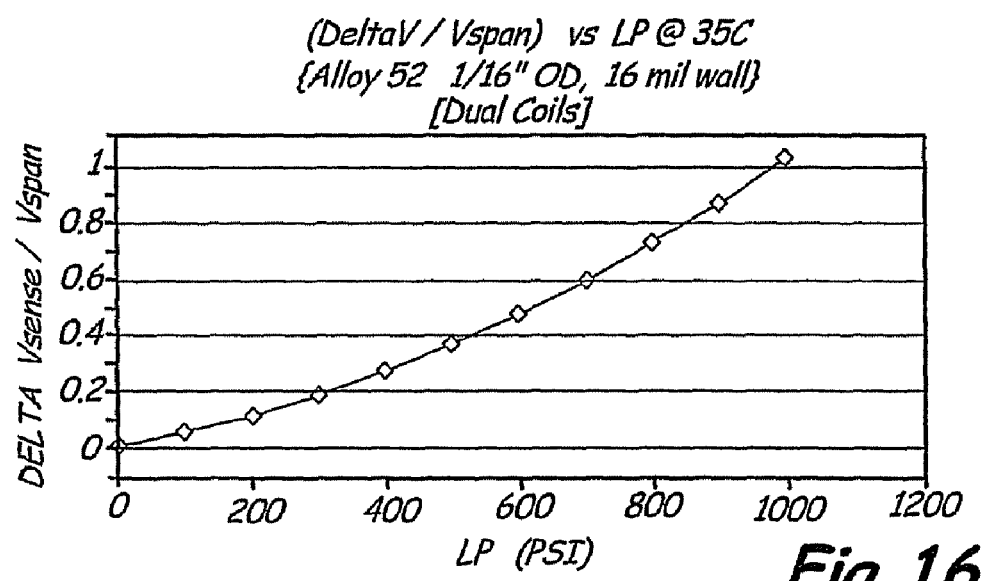
FIG. 16 is a graph which illustrates a change in voltage based upon an applied line pressure for a double coil design.
Figure 17:
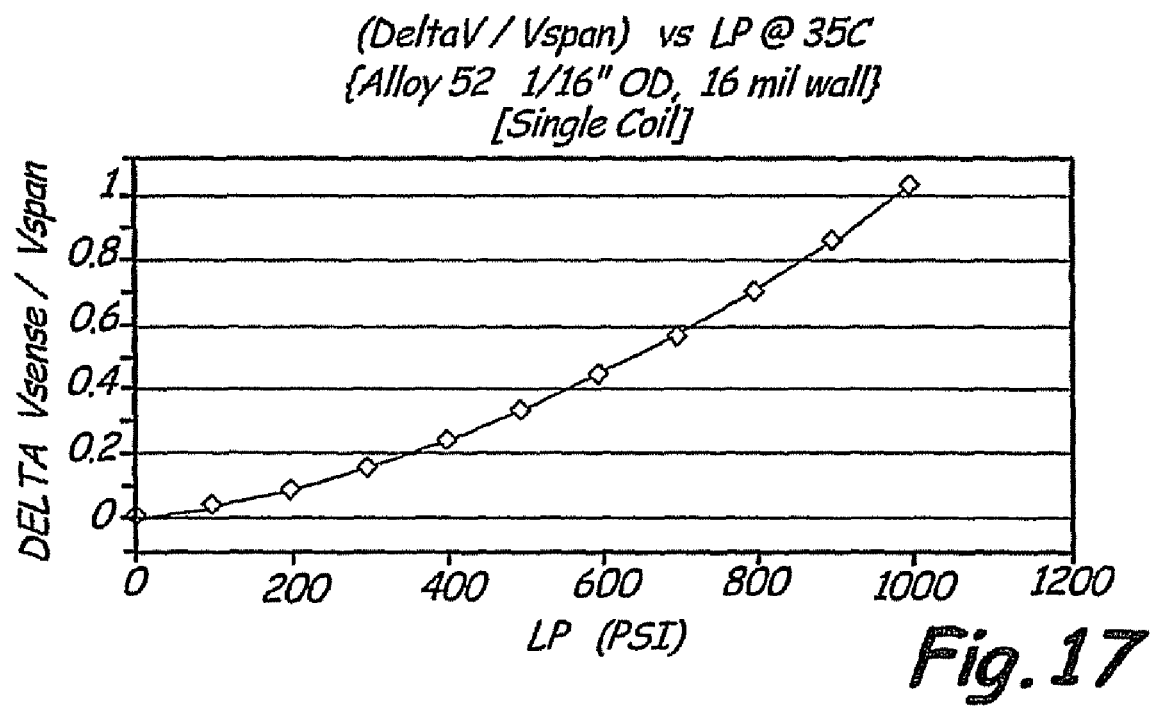
FIG. 17 is a graph which illustrates a change in voltage based upon an applied line pressure for a single coil design.

FIG. 16 is a graph of relative voltage change (as a fraction of span) in the output of a voltage sensor 222 versus line pressure from a dual coil sensor such as that shown in FIGS. 12A, 12B and 13. FIG. 17 is a similar graph for a single coil configuration such as that shown in FIGS. 14A, 14B and 15. As illustrated in FIGS. 16 and 17, the sensed voltage is related to the line pressure. A measurement circuit can be designed that oscillates with a frequency based on the inductance value of the tube, and therefore provide a means of measuring pressure as the inductance varied with pressure. This method is in contrast to the earlier describe method whereby the tube was made to mechanically oscillate at it longitudinal resonant frequency via a magnetostrictive drive mechanism.

Figure 18:
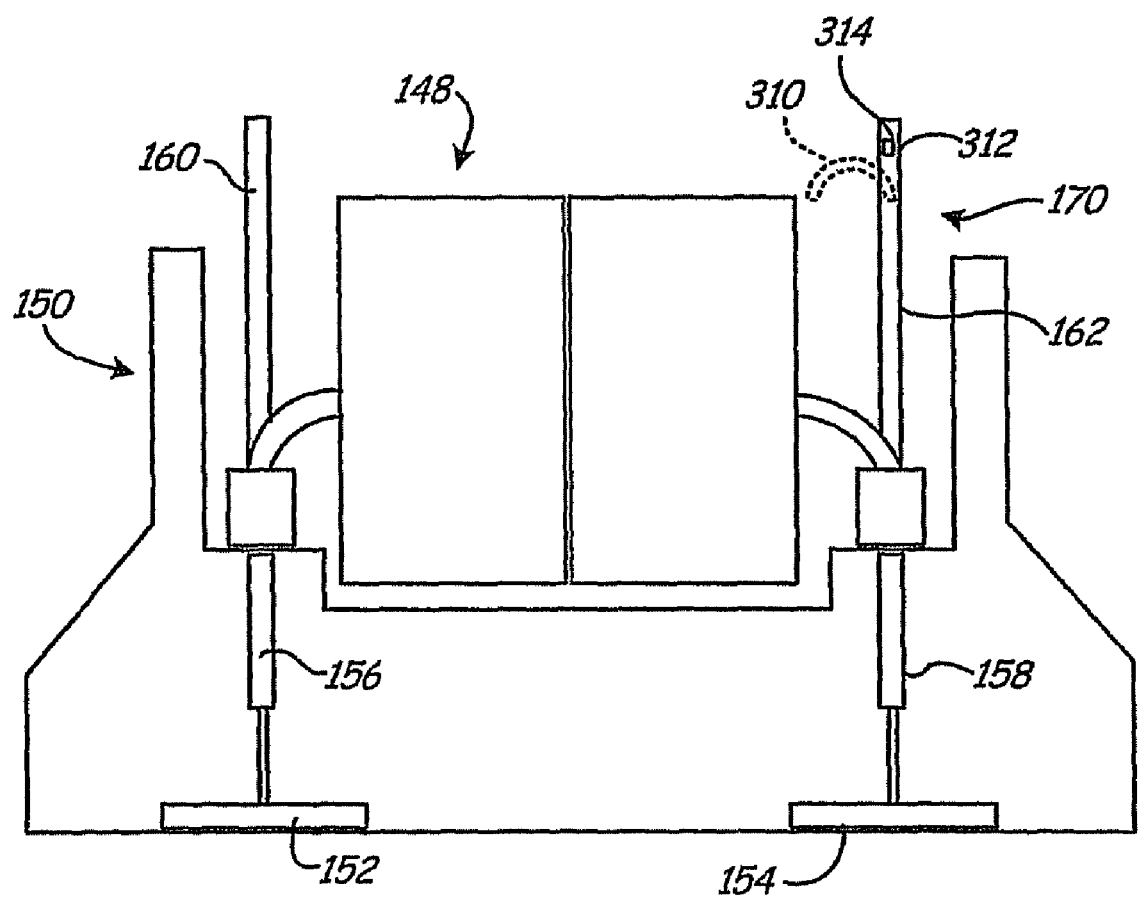
FIG. 18 is a simplified diagram showing a configuration in which a Bourdon tube is used to measure line pressure.

FIG. 18 illustrates another configuration of a deformation sensor 170 in accordance with the present invention. In the configuration of FIG. 18, a portion of one of the fill tubes (fill tube 162) is configured as a Bourdon tube. With a Bourdon tube, a portion of the tube is configured with a bend as illustrated at 310 in FIG. 18 at a particular pressure, for example at a pressure of zero. This portion 310 then straightens as pressure is applied and eventually reaches its maximum pressure at which time the tube is straight as illustrated at 312 in FIG. 18. A sensor 314 such as a strain gauge or other sensor is coupled to the Bourdon tube to measure the deformation of the tube. The output from sensor 314 is provided to line pressure measurement circuitry such as circuitry shown in FIG. 2.

As referenced above, any appropriate technique can be used to measure the deformation of the tube or other physical property of the tube including a change in the stiffness of the tube. These techniques include strain gauge techniques, measurements of resonance, and others. Any physical property of the tube which changes with pressure may be measured and used in accordance with the present invention. The tube can be configured to enhance sensitivity, for example by varying the thickness of the tube. Tube geometry may also be selected to enhance performance and amplify the sensor signal. As discussed above, a differential measurement may be obtained by measuring physical changes in both of the capillary tubes. In another example, the Bourdon tube is placed proximate measurement circuitry and forms a capacitance with the measurement circuitry 10 illustrated in FIG. 2. As the Bourdon tube deforms, the capacitance changes and may be correlated with the applied pressure.

In another example embodiment, the pressure sensor 170 is implemented using a frequency modulated vibrating quartz sensor. In some applications, this may be preferable due to the inherent digital nature of the output signal. When quartz is used as a sensor material it provides excellent stability of bias frequency and span. In addition, quartz has relatively low temperature sensitive activity. The piezo electric property of a quartz crystal can be used to provide a means of sustaining vibration using an oscillator circuit. The present invention includes a non-intrusive external piezo electric sensor is coupled to an oil fill tube. An oil fill tube is one example of a sensor body and the invention is not limited to this configuration. Further, the pressure sensor of the present invention can be used alone, or in combination with another pressure sensor such as a gauge, absolute or differential pressure sensor. The coupling may be internal or external. The pressure inside the fill tube changes the resonate frequency of the external quartz structure. Using a quartz resonator to measure pressure is known in the art. However, the present invention provides a non-intrusive configuration for such measurements.

Figure 19:
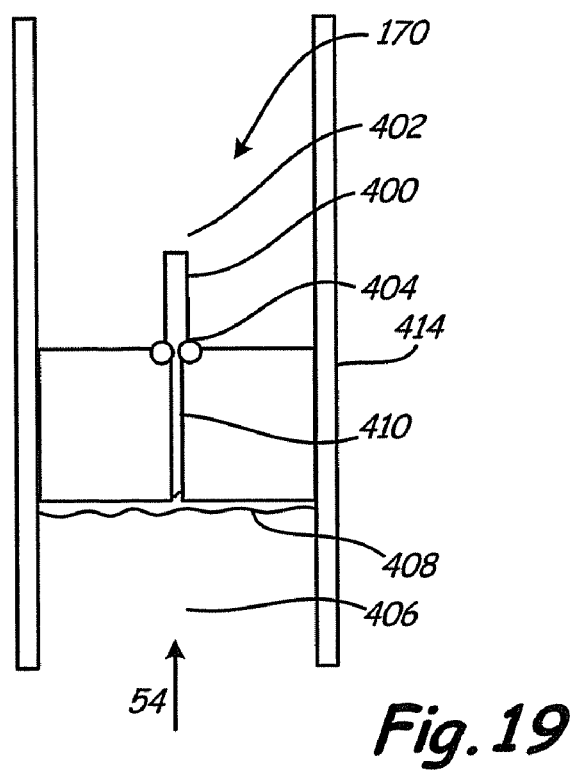
FIG. 19 is a cross-sectional view of an embodiment of the present invention configured to measure line pressure using a quartz sensor.

FIG. 19 is a cross-sectional view of pressure sensor 170. Pressure sensor 170 includes an oil filled tube 400 having a sealed end 402 and an open end 404. Tube 400 is one example of a sensor body. The open end 404 is configured to receive the pressure 54 from a process connection 406. A process isolation diaphragm 408 isolates process fluid from the oil filled tube 400. An oil path 410 which can comprise for example, a thin capillary tube extends from the process isolation diaphragm 408 and the tube opening 404. The entire assembly is contained within a housing 414.

As explained below, a quartz sensor 420 (see FIG. 20B) is mounted to the oil filled tube 400 and has a resonance which changes based upon the applied pressure. The relationship between applied pressure and resonate frequency can be determined through experimentation or other means. The oil filled tube 400 can be considered a cantilever beam. The inside of the oil fill tube is at a higher pressure than the outside. This results in stresses in the tube wall. The tube wall stretches ever so slightly in response to the stress. The quartz crystal is held in contact with tube with two mounts at either end, which were rigidly attached to the tube. The tube wall length changes produce resultant stress in the crystal. Thus resonant frequency of the crystal changes as a function of pressure applied to the tube.

In a simplified circuit pressure sensing circuitry. It is configured to sense a pressure within tube 400 using quartz crystal 420. Resonant circuitry couples to the quarts crystal 420 and provides a frequency output to a digital converter. The resonant circuitry will resonate at a frequency, using known techniques, based upon the stress applied to the quartz crystal 420 from tube 400. This frequency is therefore indicative of the applied pressure. Measurement circuitry is configured to convert the measured frequency to a pressure and provide a pressure output.

Figure 20:
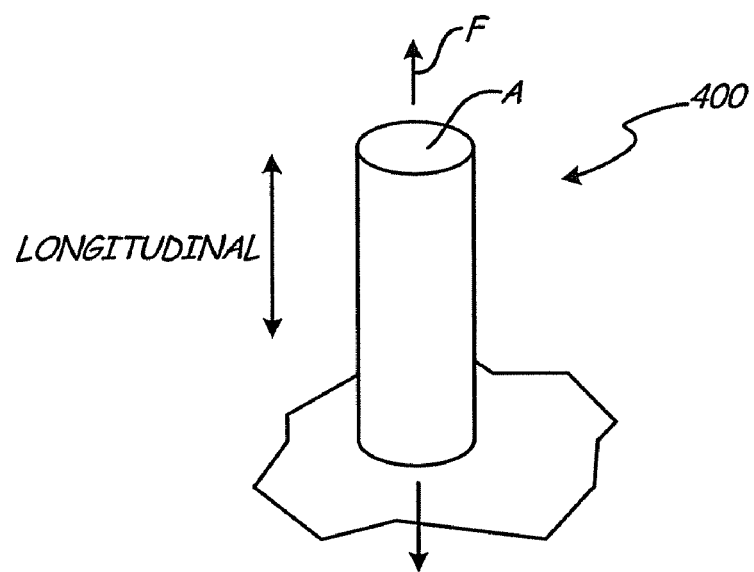
FIG. 20 is a diagram which illustrates stresses on a sensor.
Figure 20A:
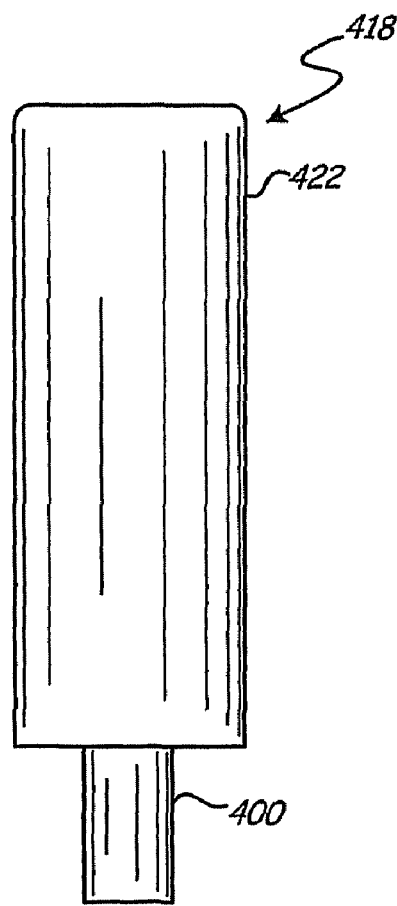
FIG. 20A is a side plan view.
Figure 20B:
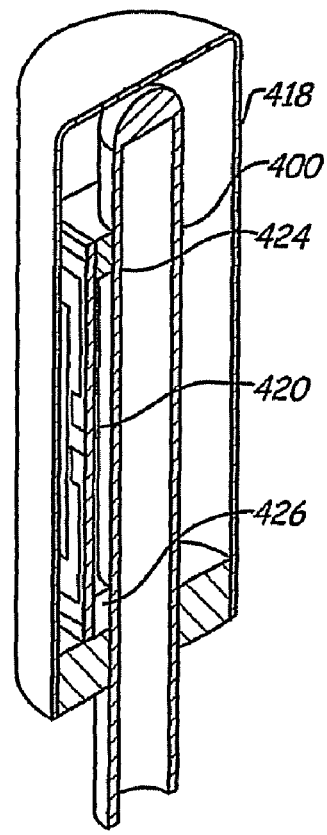
FIG. 20B is a side cross-sectional view.
Figure 20C:
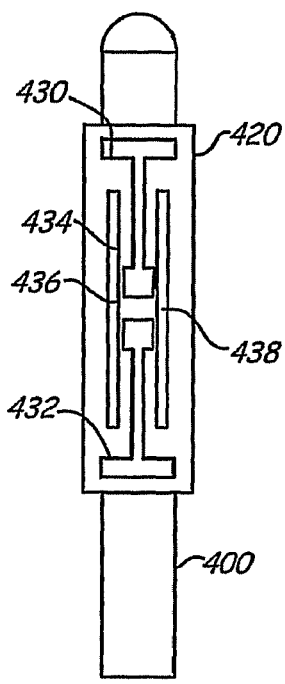
FIG. 20C is a front plan view.
Figure 20D:
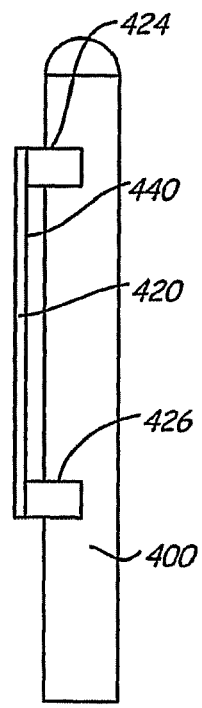
FIG. 20D is a side plan view and FIG. 20E is a perspective view of a pressure sensor using a quartz crystal.
Figure 20E:
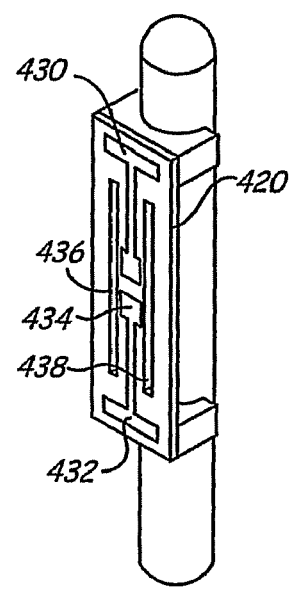

In the FIG. 20, when a stress is applied, the length of the tube will change by an amount:

$$\Delta L = \epsilon L_o = FL_o/AE = \sigma_a L_o/E \qquad \text{EQ. 3}$$

where E is Young's Modules, $\epsilon$ is strain, F is force, A is area, Lo is the original length of the tube.

The stress in axial direction at a point in the tube wall can be expressed as:

$$\sigma_a = (p_i r_i^2 - p_o r_o^2)/(r_o^2 - r_i^2), \text{ where} \qquad \text{EQ. 4}$$

$\sigma_a$ = stress in axial direction
$p_i$ = internal pressure in the tube $p_o$=external pressure in the tube
$r_i$=internal radius of tube
$r_o$=external radius of tube The hoop stress (circumferential stresses) defined below has twice the magnitude of the axial stress. In order to increase the sensitivity of the sensor the crystal beam axis is 5 degrees off the tube axis. The purpose is to pick up hoop stresses of the tube. The Stress in Circumferential Direction (Hoop Stress) at a point in the tube wall can be expressed as:

$$\sigma_c = [(p_i r_i^2 - p_o r_o^2)/(r_o^2 + r_i^2)] + [r_i^2 r_o^2 (p_o - p_i)/r^2 (r_o^2 - r_i^2)],$$
where
EQ. 5

$\sigma_c$=stress in circumferential direction, r=radius to point in tube wall maximum stress when $r=r_I$ (inside pipe).

FIG. 20 is a diagram showing several resonate vibration modes of a tube. These include longitudinal, translational and sheer modes. The translational mode resonate frequency is inversely proportional to the square of the length. It is analogous to the wagging of a dog's tail and may provide relatively low sensitivity to pressure changes. Similarly, the shear resonance is inversely proportioned to the length and consists of a propagating wave which travels the length of the tube. This also is relatively insensitive to pressure changes. The longitudinal resonate frequency is also inversely proportional to the length and is similar to the resonance of an elongate tube such as a pipe organ. Further, the resonate frequency is also proportionate to the square root of the ratio of tube stiffness divided by the tube mass. This yields a relatively complex relationship as increasing pressure affects both of these terms.

In one configuration, an AT cut crystal is preferred. This configuration is such that forces which cross at the plane of the sensor cause frequency changes similar to, or greater in amplitude to, those produced by other cuts of the crystal. One characteristic of the AT cut is that the resonate frequency is not affected by temperature in an unstressed condition. As the crystal is rigidly mounted, a temperature change will cause stress in the crystal and therefore a change in the resonate frequency. However, the resonate frequency does return to a nominal value as the temperature changes solely due to differential thermal expansion. Further, crystals with an AT-cut experience large compression forces prior to fracturing and provide a nearly linear force to frequency relationship. This configuration can also oscillate in the thickness (shear mode) and are more rugged than crystals oscillating in other modes. This cut can also respond very rapidly to step changes in stress.

FIGS. 20A-20E show side plan, cross-sectional, front plant, side plan and perspective views of sensor 170 including a quartz crystal structure 420 in accordance with one example embodiment (it can be a single supported beam structure or a triple bar structure). The crystal structure 420 is a triple bar structure in which the central bar vibrates in opposition to the two outer beams. This structure can be clamped at both ends and the entire crystal mounted on a cantilever tube. Electrodes are vacuum deposited on the crystal surface to form the two top surface electrical connections, and a ground plane on the underside of the crystal. In FIGS. 20A-20E, a pressure sensor assembly 418 is shown. Assembly 418 includes a housing 422 and couples to oil fill tube 400. In the cross-sectional view shown in FIG. 20B, the quartz crystal 420 is shown in mounted to tube 400 with crystal mounts 424 and 426 which are arranged at opposed ends of the crystal 420. As illustrated in more clearly in the plan view of FIG. 20C, crystal 420 includes electrodes 430 and 432 which extend to a vibrating beam section 434 which is defined between two cut out regions 436 and 438. An electrical ground 440 (shown in FIG. 20D) is provided along the backside of crystal 420.

As discussed above, the resonance frequency of the quartz crystal 420 will change as a function of deformation to the tube 400. The fundamental flexural resonance frequency of a rectangular beam anchored at both ends is given by:

$$f_0 = 1.028 \frac{t}{l^2} \sqrt{\frac{Eg}{\rho}}$$
EQ. 6 where g is the gravitational acceleration constant, E is Young's modulus in the length direction, $\rho$ is the density of the material, t is the thickness, and l is the length between the anchored points. In the structure shown in FIGS. 20A-E the fundamental frequency is lower than that shown above because the beams are anchored beyond the points where they are joined and a reduction in $f_0$ is to be expected. When a tensile stress is applied along the length of the beam, the fundamental frequency f is given by $$f^2 \approx f_0^2 + \frac{\sigma \cdot g}{\rho \cdot L^2}$$
EQ. 7 where $$L \equiv \frac{4l}{3}.$$

In one configuration, the oil fill tube can be slightly pre-bent with a curvature. The total beam curvature change with full scale pressure applied is less than 0.0025 mm. The beam vibrates under fixed end conditions in the vertical plane. The bias frequency is typically 40 kHz, which decreases in response to tube expansion. The oil fill tube acts like a vibration isolation system. The mass of the tube prevents vibration energy from escaping, resulting in high vibration Q. The beam vibrations are sustained by the combination of the piezoelectric properties of quartz crystal, electrodes plated on the beam, and electrical energy provided by an oscillator circuit. The oil fill tube can be straight as shown. The Q factor is proportional to the ratio of the energy stored to energy lost per cycle in the vibration system. The losses are from the change of the rigidity of the pipe that is proportional to the pressure.

Figure 21:
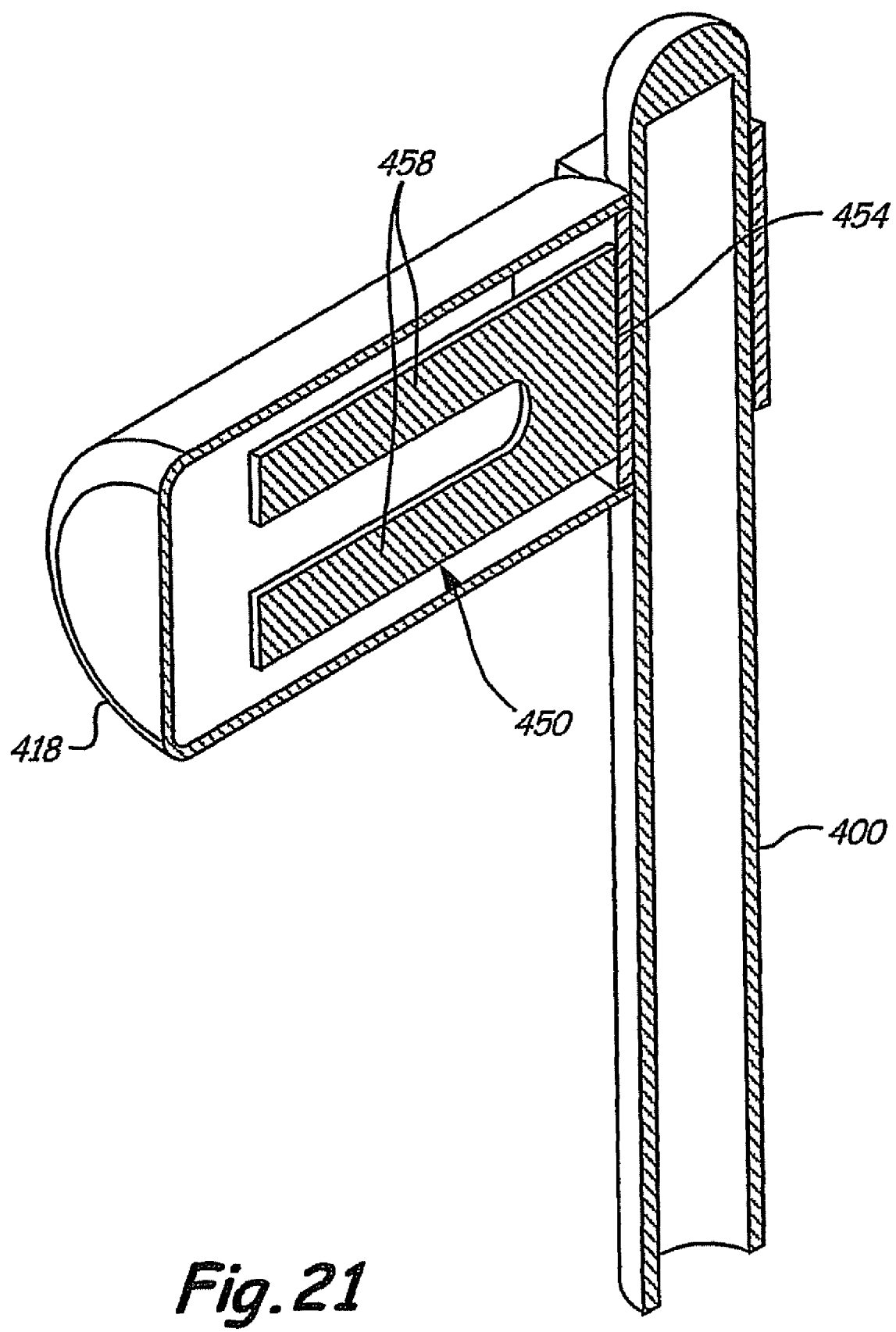
FIG. 21 is a side cross-sectional view of an other example embodiment using a tuning fork configuration.

FIG. 21 shows a cross-sectional view of the quartz tuning fork embodiment. This embodiment uses a quartz crystal tuning fork 450 to detect the pressure in the oil fill tube 400. Quartz crystal tuning fork tactile sensors are used with robotic fingers to identify an object's physical properties such as hardness, softness, roughness, and smoothness. The material properties beneath the contact surface are identified using a longitudinal mode quartz crystal tuning fork.

The quartz crystal tuning fork 450 comprises a vibration part 458 with a support part (base) 454 that is soldered on the oil fill tube. The quartz crystal tuning fork 450 is allowed to vibrate along the Y axis under the action of the electric field along the X axis. The difference in acoustic impedance between the quartz and the base will cause the longitudinal vibration energy to leak from the sensors base radially to the tube 400. The plane wave is transmitted through the oil and reflected back to the sensor through the oil. The energy leak will let the quartz crystal tuning fork impedance increase at the resonant vibration. Since oil density will vary with pressure, the acoustic energy attenuations will vary. Therefore the acoustic impedance will vary with pressure. At a specific frequency the quartz crystal tuning fork 450 impedance is proportional to the acoustic impedance between the sensor and the oil pressure. Therefore the quartz crystal tuning fork frequency change is proportional to the pressure of the oil in the pipe.

Energy which leaks from the quartz crystal tuning fork base 454 to the tube 400 is dependent upon the contact area of the tube 400 Since the contact area is fixed, the impedance can be measured to identify the oil pressure or the sensor frequency can be compared with a pipe without pressure. The configuration has a number of advantages, including:

It is small in size these by reducing packaging costs;

Mechanical components are inexpensive including the quartz structure;

No pressure header is needed as the measurement is non-intrusive;

No A/D converter is needed since the signal is frequency based;

Temperature characterization is simplified because it will be predictable;

There is little oil movement enabling smaller diaphragms and faster response time;

Different ranges can be optimized with different tube materials;

Potential for making very high pressure devices;

Small size, low cost, and low power.

Differential pressure can be measured using two sensors arranged to sense gauge pressure. The low side differential is connected to one sensor and the high side differential is connected to the other sensor. The electronics simply compares the two frequencies.

Figure 22A:
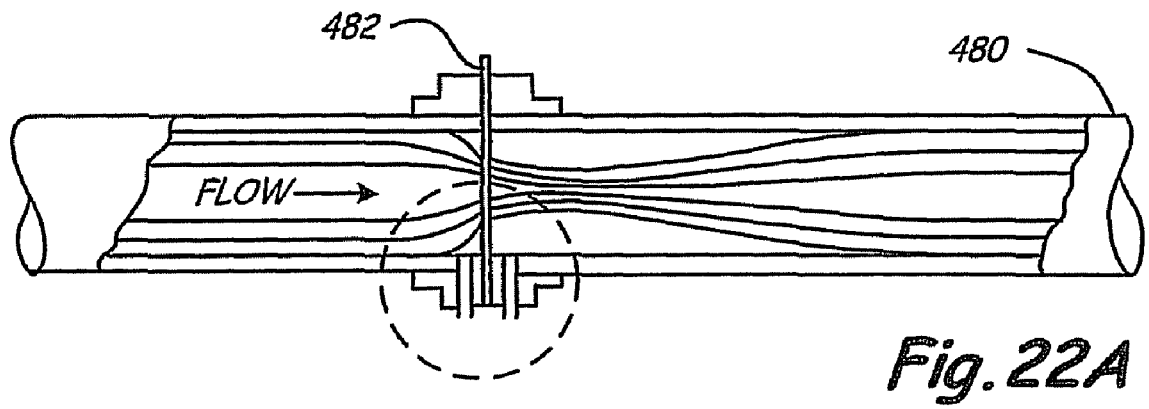
FIG. 22A is a side cross-sectional view of a float pipe and FIG. 22B is a side view of a quartz sensor arranged to measure differential pressure.
Figure 22B:
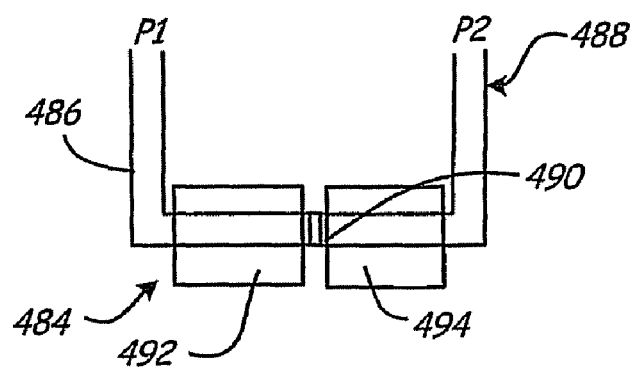

FIGS. 22A and 22B show examples of sensor arranged to sense a differential pressure. In FIG. 22A, a cross-sectional view of a tube 480 is shown which includes an orifice plate 482. Orifice plate 482 creates a differential pressure and the flow across the plate. This differential pressure is related to the flow rate. In FIG. 22B, a differential pressure 484 is shown. Sensor 484 includes a first tube 486 coupled to a pressure P1 and a second tube 488 coupled to a pressure P2. A seal 490 separates the tubes 486 and 488. A quartz sensing element 492 couples to tube 486 and a quartz sensing element 494 couples to tube 488. Sensors 492 and 494 operate in accordance with the techniques discussed above. As the differential pressure changes between pressures P1 and P2, the outputs from sensors 492 and 494 will vary accordingly. The difference between the two outputs is related to the differential pressure (P1–P2). In the configuration shown in FIGS. 22A and 22B, the tubes 486 and 488 can be arranged to couple directly to the process fluid. In an alternative embodiment, isolation diaphragms are employed along with a fill fluid.

In other design configurations, a second deformation sensor can be applied to the second fill tube. Using such a configuration, a redundancy check can be provided in which the outputs from the two deformation sensors are compared. Similarly, a differential pressure may be obtained by subtracting the pressure associated with one of the deformation sensors with the pressure associated with the other deformation sensor. Although the deformation sensor discussed herein is illustrated as being associated with the fill tube portion of the capillary tube, the sensor can be located along any appropriate region of the capillary tube and is not limited to this configuration. In another example configuration, the drive coil is associated with one of the capillary tubes while the sensor coil is associated with the other capillary tube. In such a configuration, line pressure as well as differential pressure may be obtained by monitoring the duty cycle in addition to the frequency of oscillation. Any appropriate material which illustrates a magnetostrictive effect may be used including, for example, Ni-Span, Alloy 52, a nickel-iron alloy, etc. Preferably, the oscillator is configured as a positive feedback oscillator.

Figure 23:
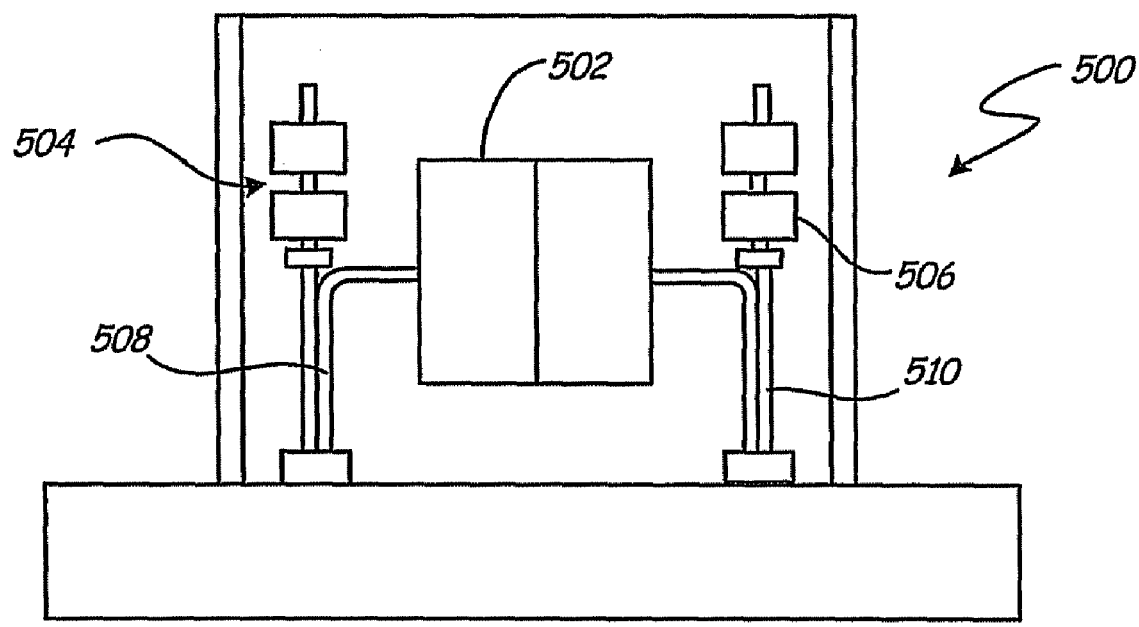
FIG. 23 is a side cross-sectional view of a pressure measurement system for measuring differential pressure.

FIG. 23 is a side cross-sectional view of a pressure measurement system 500 arranged to measure both differential pressure and line pressures. Using the configuration of FIG. 23, a differential pressure sensor 502 is coupled to the process fluid through fill tubes 508 and 510. Additional pressure sensors 504 and 506 are arranged to measure individual line pressures LP1 and LP2. These additional sensors can also be used to determine differential pressure based upon the difference between the two sensor outputs. The differential pressure measured by sensors 504 and 506 can be used to verify operation of differential pressure sensor 502. In another example, sensors 504 and 506 are used to measure differential pressure when the pressure value is out of range of pressure sensor 502. Any type of absolute pressure sensor such as those discussed above may be used to implement sensors 504 and 506.

Figure 24:
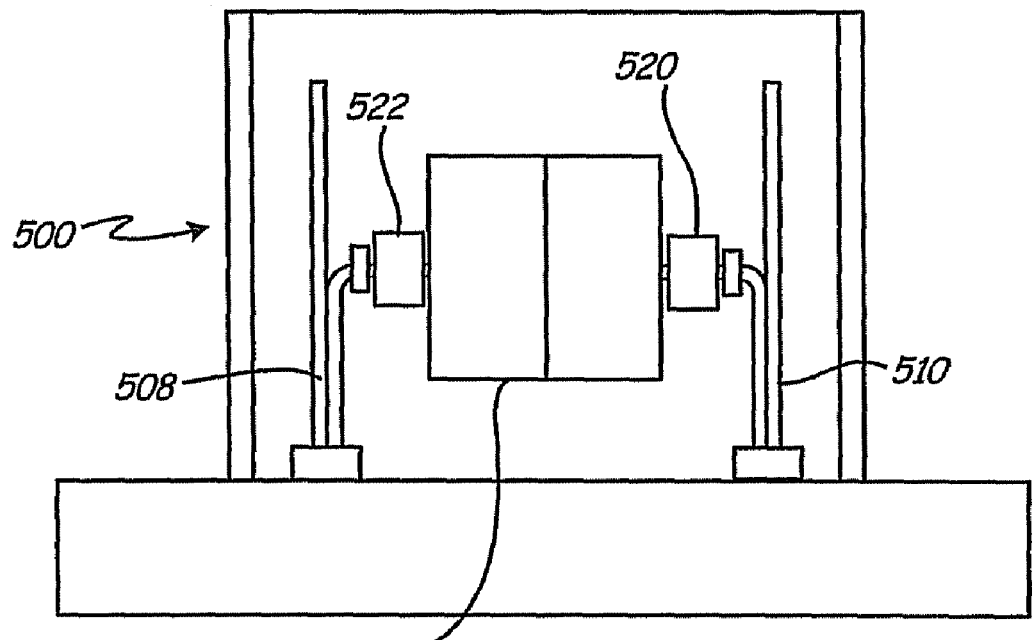
FIG. 24 is a side cross-sectional view of a pressure measurement system for measuring differential pressure.

FIG. 24 is a cross-sectional view of pressure measurement system 500 in accordance with another example embodiment. In FIG. 24, elements 520 and 522 may comprise individual line pressure sensors such as those discussed above. In another example embodiment, pressure tubes 508 and 510 comprise a metal which exhibits a magnetostrictive property and element 520 may comprise a drive coil while element 522 may comprise a sensor coil. In such a configuration, the entire differential pressure sensor 502 can be caused to vibrate using the techniques discussed above and the resonant frequency sensed by sense coil 522 will be a function of the differential pressure. This can be used to provide a redundant differential pressure measurement.

Although the present invention has been described with reference to preferred embodiments, workers skilled in the art will recognize that changes may be made in form and detail without departing from the spirit and scope of the invention. As used herein, line pressure refers to both absolute and gauge pressure.

What is claimed is:

1. A pressure sensor, comprising:
  a differential pressure sensor having a first port, a second port and an output related to a differential pressure between the first and second ports;
  a first fill tube arranged to couple the first port to a first process pressure;
  a second fill tube arranged to couple the second port to a second process pressure; and
  a fill tube physical property sensor coupled to the first tube configured to measure a pressure of fill fluid in the first tube as a function of a change of a physical property of the first fill tube.

2. The apparatus of claim 1 wherein the physical property comprises deformation of the first fill tube.

3. The apparatus of claim 1 wherein the physical property comprises stiffness of the first fill tube.

4. The apparatus of claim 1 wherein the fill tube physical property sensor measures a magnetic property of the first fill tube.

5. The apparatus of claim 4 wherein the fill tube physical property sensor is arranged to measure oscillations in the first fill tube.

6. The apparatus of claim 5 wherein the frequency of oscillations is related to the line pressure.

7. The apparatus of claim 4 including circuitry configured to resonate as a function of the magnetic property.

8. The apparatus of claim 7 including a node stop arranged to reflect vibrations in the sensor body.

9. The apparatus of claim 4 including a drive coil which is driven at a desired frequency and arranged to induce a magnetic flux in the sensor body, and a sense coil.

10. The apparatus of claim 4 wherein the fill tube is configured to resonate mechanically due to a magnetostrictive effect and at a frequency related to the applied process pressure.

11. The apparatus of claim 4 including a bias magnet adjacent the fill tube configured to apply a bias magnetic field.

12. The apparatus of claim 4 wherein the circuitry is further configured to measure a temperature of the fill tube as a function of the magnetic property.

13. The apparatus of claim 4 wherein the magnetic property comprises magnetic permeability.

14. The apparatus of claim 13 wherein the changes in the magnetic permeability of the sensor body is a function of strain placed on the sensor body due to the applied process pressure.

15. The apparatus of claim 4 wherein the circuitry is configured to sense a B field resultant from an applied AC magnetic field.

16. The apparatus of claim 15 wherein the circuitry is further configured to oscillate at a frequency based on the magnetic permeability property.

17. The apparatus of claim 1 including a pressure sensor coupled to the second fill tube.

18. The apparatus of claim 17 including measurement circuitry arranged to measure a differential pressure based upon an output from the fill tube physical property sensor and the second pressure sensor.

19. The apparatus of claim 1 wherein the first fill tube is configured as a Bourdon tube.

20. The apparatus of claim 1 wherein the fill tube physical property sensor comprises a strain gauge coupled to the first fill tube.

21. The apparatus of claim 1 wherein the fill tube physical property sensor comprising a capacitor arranged to have a capacitance with the first fill tube which changes as a function of line pressure.

22. The apparatus of claim 1 wherein the fill tube physical property sensor is further configured to measure temperature as a function of a change of the physical property of the first fill tube.

23. The apparatus of claim 1 wherein the fill tube physical property sensor comprises a quartz element.

24. A method for measuring pressures in an industrial process, comprising:
    coupling a first fill tube to the process to measure a first process pressure;
    coupling a second fill tube to the process to measure a second process pressure;
    measuring a differential pressure using a differential pressure sensor coupled to the first and second fill tubes; and
    measuring a line pressure of the process fluid based upon a change in a physical property of the first fill tube.

25. The method of claim 24 wherein the physical property comprises deformation of the first fill tube.

26. The method of claim 24 wherein the physical property comprises stiffness of the first fill tube.

27. The method of claim 24 wherein measuring line pressure comprising measuring a magnetic property of the first fill tube.

28. The method of claim 27 including providing a drive coil which is driven at a desired frequency and arranged to induce a magnetic flux in the fill tube body.

29. The method of claim 27 wherein the fill tube is configured to resonate mechanically due to the magnetostrictive effect and as a function of the applied process pressure.

30. The method of claim 29 wherein measuring line pressure comprises measuring oscillations in the first fill tube.

31. The method of claim 30 including providing a node stop arranged to reflect vibrations in the sensor body.

* * * * *